United States Patent
Ikuta et al.

(10) Patent No.: US 6,800,372 B2
(45) Date of Patent: Oct. 5, 2004

(54) COMPOSITE AND PROCESS FOR PRODUCING THE SAME

(75) Inventors: Toru Ikuta, Kobe (JP); Hajime Komada, Himeji (JP); Mitsuteru Mutsuda, Himeji (JP)

(73) Assignee: Daicel-Degussa Ltd., Tokyo (JP)

( * ) Notice: Subject to any disclaimer, the term of this patent is extended or adjusted under 35 U.S.C. 154(b) by 60 days.

(21) Appl. No.: 10/221,733

(22) PCT Filed: Jan. 9, 2002

(86) PCT No.: PCT/JP02/00022

§ 371 (c)(1),
(2), (4) Date: Sep. 16, 2002

(87) PCT Pub. No.: WO02/055297

PCT Pub. Date: Jul. 18, 2002

(65) Prior Publication Data

US 2003/0170469 A1 Sep. 11, 2003

(30) Foreign Application Priority Data

Jan. 16, 2001 (JP) .................................. 2001/008070

(51) Int. Cl.$^7$ ............................................. B32B 25/20
(52) U.S. Cl. ....................... 428/447; 428/451; 427/387; 525/474; 525/479
(58) Field of Search ................................ 428/447, 451; 427/387; 525/474, 479

(56) References Cited

U.S. PATENT DOCUMENTS

| | | | | |
|---|---|---|---|---|
| 4,686,124 A | * | 8/1987 | Onohara et al. | 428/35.2 |
| 5,053,167 A | * | 10/1991 | Kawaguchi | 252/511 |
| 5,366,805 A | * | 11/1994 | Fujiki et al. | 428/412 |
| 5,418,065 A | * | 5/1995 | Fujiki et al. | 428/451 |
| 5,792,812 A | * | 8/1998 | Fujiki et al. | 525/105 |
| 5,879,809 A | * | 3/1999 | Muramatsu et al. | 428/412 |
| 5,904,887 A | * | 5/1999 | Nakamura et al. | 264/255 |
| 6,645,638 B2 | * | 11/2003 | Fujiki et al. | 428/447 |

FOREIGN PATENT DOCUMENTS

| | | |
|---|---|---|
| EP | 249336 A2 * 12/1987 | B29C/45/16 |
| EP | 0 276 790 A2 | 8/1988 |
| EP | 0 601 881 A1 | 6/1994 |
| EP | 0 601 882 A1 | 6/1994 |
| JP | 50-25682 A | 3/1975 |
| JP | 61-204260 A | 9/1986 |
| JP | 2-150439 A | 6/1990 |
| JP | 3-133631 A | 6/1991 |
| JP | 3-138114 A | 6/1991 |
| JP | 4-323226 A | 11/1992 |
| JP | 7-11013 A | 1/1995 |
| JP | 7-166043 A | 6/1995 |
| JP | 7-304880 A | 11/1995 |
| JP | 8-156188 A | 6/1996 |
| JP | 9-124803 A | 5/1997 |
| JP | 10-58605 A | 3/1998 |
| JP | 10-95071 A | 4/1998 |

OTHER PUBLICATIONS

Machine translation of JP–08–224833, Meguriya et al. Sep. 1996, obtained from JPO web–site.*
Machine translation of JP–10–095071, Kuze et al. Apr. 1998, obtained from JPO web–site.*

* cited by examiner

Primary Examiner—Jeffrey B. Robertson
(74) Attorney, Agent, or Firm—Birch, Stewart, Kolasch & Birch, LLP

(57) ABSTRACT

A composite of a resin member bonded to a rubber member is obtained by molding a resin molding element and a rubber molding element with contacting said elements each other, and vulcanizing or crosslinking the rubber molding element, wherein said resin molding element is either of a resin composition and a resin member, each comprising the thermoplastic resin; and said rubber molding element is either of a rubber composition and a rubber premolded article, each comprising at least an unvulcanized silicone rubber, and a radical-generating agent (e.g., organic peroxides) being activating on a surface to be contacted with said resin molding element. The thermoplastic resin includes a polyamide-series resin, a polyester-serires resin, a PPE-series resin, etc. The unvulcanized rubber composition may comprise a polyfunctional compound having plural polymerizable groups. Such a process can give a composite composed of a thermoplastic resin molded article bonded to a vulcanized silicone rubber molded article directly and firmly without an adhesive treatment.

22 Claims, No Drawings

US 6,800,372 B2

COMPOSITE AND PROCESS FOR PRODUCING THE SAME

This application is the national phase under 35 U.S.C. § 371 of PCT International Application No. PCT/JP02/00022 which has an International filing date of Jan. 9, 2002, which designated the United States of America.

TECHNICAL FIELD

The present invention relates to a composite (or a composite member) of a thermoplastic resin bonded to a silicone rubber integrally which is useful for a mechanical part or a machine element, an automobile part and so on, and relates to a process for producing the same.

BACKGROUND ART

An adhering method for adhering a resin molded article to a rubber molded article by an adhesive is known as a process of integrally joining a resin molded element to a rubber molded element. However, the process using the adhesives not only complicates the process to cause a troublesome process-control with resulting in costly but also does not necessarily give a sufficient adhesive strength.

Meanwhile, a composite of a resin directly bonded to a rubber has been proposed. For example, Japanese Patent Application Laid-Open No. 25682/1975 (JP-50-25682A) discloses a process for producing a rubber-plastic composite, which comprises rubbing a thermoplastic plastic component (e.g., a polyformaldehyde and an olefinic polymer) and a vulcanized rubber component compatible with the thermoplastic plastic component with contacting each other to melt or fuse the surface of the plastic, and solidifying the melted surface of the resin with contacting the thermoplastic resin component and the vulcanized rubber component.

Regarding to a process for producing a composite with utilizing a compatibility between a thermoplastic resin and a rubber, Japanese Patent Application Laid-Open No. 204260/1986 (JP-61-204260A) discloses a process for producing a composite, which comprises heating a polyphenylene ether-series resin and a synthetic rubber in the presence of a vulcanizing agent. Japanese Patent Application Laid-Open No. 124803/1997 (JP-9-124803A) discloses a process for producing a composite member, which comprises heating an acrylonitrile-containing thermoplastic resin and an acrylonitrile-containing rubber with closely contacting each other.

Referring to a process for producing a composite with utilizing a chemical reaction between a thermoplastic resin and a rubber, Japanese Patent Application Laid-Open No. 150439/1990 (JP-2-150439A), Japanese Patent Application Laid-Open No. 133631/1991 (JP-3-133631A) and Japanese Patent Application Laid-Open No. 138114/1991 (JP-3-138114A) disclose a process for producing a composite comprising a polyamide-series resin and a rubber component containing a carboxyl group- or an acid anhydride group-containing rubber, a peroxide, and a vulcanization-activating agent. Japanese Patent Application Laid-Open No. 156188/1996 (JP-8-156188A) discloses a process for producing a composite member, which comprises vulcanizing or crosslinking a carboxyl group- or an acid anhydride group-containing rubber member with contacting closely an epoxy group-containing resin member.

Further, as a process for producing a composite with the use of the specific additive, Japanese Patent Application Laid-Open No. 11013/1995 (JP-7-11013A) discloses a process for producing a composite, which comprises vulcanizing a rubber compound composed of a rubber, a peroxide vulcanizing agent and a silane compound, if necessary, a vulcanization-activating agent, in contact with a polyamide molded article. Furthermore, there are disclosed a process for producing a composite which comprises using a thermoplastic polyester as a hard component and a rubber component comprising a rubber, a peroxide vulcanizing agent, a bi- or poly-functional maleimide, if necessary, and a vulcanization-activating agent as a soft component [Japanese Patent Application Laid-Open No. 304880/1995 (JP-7-304880A)], and a process for producing a composite, which comprises using a rubber component containing a rubber, a peroxide vulcanizing agent, a silane compound, if necessary, and a vulcanization-activating agent [Japanese Patent Application Laid-Open No. 166043/1995 (JP-7-166043A)].

However, such processes are restricted in the species of a thermoplastic resin and a rubber. Especially, it is difficult to obtain a composite of a poor-reactive silicone rubber and the thermoplastic resin.

Japanese Patent Application Laid-Open No. 58605/1998 (JP-10-58605A) discloses a process for producing the composite film, which comprises laminating a substrate film (e.g., a polyester film) and a rubber film (e.g., silicone rubber, ethylene-propylene-series rubber) composed of a polyfunctional methacrylate as an adhesion-improving agent, and vulcanizing those, and the laminating step comprises laminating a rubber film layer having a large amount of an adhesion-improving agent on the substrate film, and laminating a rubber film layer having a small amount of an adhesion-improving agent on the laminated rubber film. In the literature, there is disclosed an example that a rubber solution having a large amount of an adhesion-improving agent and a rubber solution having a small amount thereof are coated in this order on an one-side surface of a substrate film which is treated with a corona discharge or adhesive treatment (easy adhesive treatment) in order to adhere with a rubber easily, and the external surface of the covering sheet is laminated on a rubber film, and the resultant laminated sheet is irradiated by an electron beam which has a high energy.

However, the process requires not only a treatment for the surface of the substrate but forming a double-layered rubber film on the surface of the substrate for achieving a high adhesion strength. Therefore, a configuration of a composite is restricted to a two-dimensional one, and thus a composite comprising a thermoplastic resin molded article and a rubber molded the process requires a preparation of the rubber solution, a production efficiency of the composite film can not be increased. Moreover, since the process utilizes coating technique to form a rubber layer, it is difficult that the process is applied to bonding between a rubber molded article and a resin molded article which has a thicker and/or three-dimensional configuration.

It is, therefore, an object of the present invention to provide a composite of a thermoplastic resin molded article bonded to a silicone rubber molded article directly and firmly without an adhesive treatment of the surface of the thermoplastic resin, and a process for producing the same.

It is another object of the present invention to provide a composite which is excellent in an adhesion strength between a thermoplastic resin molded article and a rubber molded article and has three dimensional configuration, and a process for producing the same.

DISCLOSURE OF INVENTION

The inventors of the present invention did intensive research, and finally found that a thermoplastic resin molded article can directly bond to a vulcanized silicone rubber molded article by contacting the thermoplastic resin molded article and a rubber composition composed of an unvulcanized silicone rubber and an organic peroxide, and heat-molding the molded article and the rubber composition; and further the thermoplastic resin molded article can surely and directly bond to the vulcanized silicone rubber molded article firmly by selecting a thermoplastic resin based on the specific criteria and selectively a species or formulation of the unvulcanized silicone rubber, and by coexisting an organic peroxide with a polyfunctional (meth)acrylic monomer.

That is, the composite of the present invention is a composite of a vulcanized silicone rubber member formed by a vulcanization of an unvulcanized silicone rubber, and a resin member comprising a thermoplastic resin and directly bonded to the rubber member, wherein the resin member bonds directly to the vulcanized silicone rubber member vulcanized or crosslinked with a radical-generating agent without an adhesive treatment of the resin member. The thermoplastic resin includes, for example, a polyamide-series resin, a polyester-series resin, a poly(thio)ether-series resin, a polycarbonate-series resin, a polyimide-series resin, a polysulfone-series resin, a polyolefinic resin, a halogen-containing vinyl-series resin, a polyurethane-series resin, a thermoplastic elastomer, and so on. The thermoplastic resin may be a thermoplastic resin having at least 2 atoms, as average, selected from a hydrogen atom and a sulfur atom per molecule, each atom having an orbital interaction energy coefficient S of not less than 0.006, wherein the orbital interaction energy coefficient S is represented by the following formula (1):

$$S=(C_{HOMO,n})^2/|E_c-E_{HOMO,n}|+(C_{LUMO,n})^2/|E_c-E_{LUMO,n}| \quad (1)$$

wherein each of $E_c$, $C_{HOMO,n}$, $E_{HOMO,n}$, $C_{LUMO,n}$, and $E_{LUMO,n}$ represents a value calculated by a semiempirical molecular orbital method MOPACPM3, $E_c$ representing an orbital energy (eV) of a radical of the radical-generating agent, $C_{HOMO,n}$ representing a molecular-orbital coefficient of a highest occupied molecular orbital (HOMO) of an n-th hydrogen or sulfur atom constituting a constitutive unit of the thermoplastic resin, $E_{HOMO,n}$ representing an orbital energy (eV) of the HOMO, $C_{LUMO,n}$ representing a molecular-orbital coefficient of a lowest unoccupied molecular orbital (LUMO) of the n-th hydrogen or sulfur atom constituting the constitutive unit of the thermoplastic resin, and $E_{LUMO,n}$ representing an orbital energy (eV) of the LUMO.

Further, at least one component selected from the unvulcanized silicone rubber and the thermoplastic resin may comprise a vulcanization-activating agent containing a polyfunctional polymerizable compound having a plurality of polymerizable groups. For example, the thermoplastic resin may comprise a vulcanization-activating agent containing a polyfunctional compound having a plurality of polymerizable groups (e.g., a polymerizable monomer having polymerizable groups such as a plurality of (meth)acryloyl groups).

Furthermore, at least one component selected from the unvulcanized silicone rubber and the thermoplastic resin may comprise a vulcanizing auxiliary comprising a compound having at least 2 hydrogen atoms on average per molecule, each hydrogen atom having an orbital interaction energy coefficient of not less than 0.006.

Moreover, the unvulcanized silicone rubber may comprise any silicone rubber of the followings (i) to (iii);
(i) a silicone rubber comprising a vulcanization-activating agent containing a polyfunctional polymerizable compound having a plurality of polymerizable groups, and having unsaturated bonds of not less than 2 on average per molecule,
(ii) a silicone rubber comprising a silica and having unsaturated bonds of not less than 2 on average per molecule, and
(iii) a silicone rubber comprising a vulcanization-activating agent containing a polyfunctional polymerizable compound having a plurality of polymerizable groups, and a silica.

The present invention includes a process for producing a composite of a thermoplastic resin-containing resin member bonded to a vulcanized silicone rubber member formed by vulcanization of a rubber composition comprising a radical-generating agent and an unvulcanized silicone rubber, which comprises molding a resin molding element and a rubber molding element with contacting said elements each other, and vulcanizing or crosslinking the rubber molding element,
wherein said resin molding element is either of a resin composition and a resin member, each comprising the thermoplastic resin, and
said rubber molding element is either of a rubber composition and a rubber premolded article, each comprising at least an unvulcanized rubber and a radical-generating agent being activating on a surface to be contacted with said resin molding element.

Further, the present invention includes also a process for producing a composite, which comprises heat-molding the resin member and the vulcanized rubber member with interposing a vulcanization-activating agent (and a coating agent containing the vulcanizing auxiliary) comprising a polyfunctional polymerizable compound having a plurality of polymerizable groups on a contact surface between the resin molding element and the rubber molding element to produce a composite the resin member bonded to a rubber member.

Furthermore, the present invention includes a process for producing a composite, which comprises heat-molding a resin member composed of a thermoplastic resin and a vulcanized rubber member with interposing a vulcanization-activating agent (and a coating agent containing the vulcanizing auxiliary) comprising a polymerizable compound having a plurality of polymerizable groups on a contact surface between the resin member and the vulcanized silicone rubber member to produce a composite of the resin member bonded to the rubber member.

DETAILED DESCRIPTION OF THE INVENTION

Resin Member

A thermoplastic resin constituting a resin member is not particularly restricted, and various thermoplastic resin can be used. In particular, when a thermoplastic resin is used in combination with a vulcanization-activating agent, widely various thermoplastic resins are available for use.

The thermoplastic resin includes, for example, a polyamide-series resin, a polyester-series resin, a poly(thio)ether-series resin (e.g., a polyacetal-series resin, a polyphenylene ether-series resin, a polysulfide-series resin, a polyetherketone-series resin), a polycarbonate-series resin, a polyimide-series resin, a polysulfone-series resin, a polyolefinic resin, a halogen-containing vinyl-series resin, a styrenic resin, a (meth)acrylic resin, a polyurethane-series resin, a thermoplastic elastomer. These thermoplastic resins can be used singly or in combination. When two or more species of the thermoplastic resins are used, a resin composition may be a composite resin composition such as a polymer alloy.

(1) A Polyamide-series Resin

As the polyamide-series resin, there may be mentioned an aliphatic polyamide-series resin, an alicyclic polyamide-series resin, and an aromatic polyamide-series resin, and the aliphatic polyamide-series resin is practically used. The aliphatic polyamide-series resin includes a condensed compound of an aliphatic diamine component (e.g., a $C_{4-10}$alkylene diamine such as tetramethylenediamine, hexamethylenediamine) and an aliphatic dicarboxylic acid (e.g., an alkylene dicarboxylic acid having about 4 to 20 carbon atoms such as adipic acid, sebacic acid and dodecanedioic acid), for example, polyamide 46, polyamide 66, polyamide 610, polyamide 612 and so on; a homopolymer or a copolymer of a lactam (e.g., a lactam having about 4 to 20 carbon atoms such as ε-caprolactam, ω-laurolactam) or an aminocarboxylic acid (e.g., an aminocarboxylic acid having about 4 to 20 carbon atoms such as ω-aminoundecanoic acid), for example, polyamide 6, polyamide 11, polyamide 12 and so on; a copolyamide copolymerizing these polyamide components (e.g., polyamide 6/11, polyamide 6/12, polyamide 66/11, polyamide 66/12) and the like.

As the alicyclic polyamide-series resin, there may be exemplified a polyamide in which an alicyclic diamine and/or an alicyclic dicarboxylic acid is used as at least part of the aliphatic diamine component and/or the aliphatic dicarboxylic acid. The alicyclic polyamide includes, for example, a condensed compound of the aliphatic dicarboxylic acid and an alicyclic diamine component [e.g., a $C_{5-8}$cycloalkyl diamine such as cyclohexyl diamine; a bis(aminocyclohexyl)alkane such as bis(aminocyclohexyl)methane and 2,2-bis(aminocyclohexyl)propane].

As the aromatic polyamide-series resin, there may be mentioned, a polyamide in which at least one component among the aliphatic diamine components and the aliphatic dicarboxylic acid components comprises an aromatic component, for example, a polyamide in which the diamine component comprises an aromatic component [e.g., a condensed compound of an aromatic diamine (e.g., meta-xylylenediamine) and an aliphatic dicarboxylic acid, such as MXD-6]; a polyamide in which the dicarboxylic acid component comprises an aromatic component [e.g., a condensate compound of an aliphatic diamine (e.g., trimethylhexamethylenediamine) and an aromatic dicarboxylic acid (e.g., terephthalic acid, isophthalic acid)]; a polyamide in which both the diamine component and the dicarboxylic acid component comprise an aromatic component [e.g., a fully aromatic amide such as a poly(m-phenyleneisophthalamide (e.g., Aramid$^{(R)}$)], and others.

The polyamide-series resin further includes a polyamide comprising a dimeric acid as the dicarboxylic acid component, a polyamide having a branched structure by introducing a small amount of a polyfunctional polyamine and/or a polycarboxylic acid component, and a modified polyamide (e.g., N-alkoxymethylpolyamide).

(2) A Polyester-series Resin

The polyester-series resin may be an aliphatic polyester-series resin, and is usually an aromatic polyester-series resin, for example, a polyalkylene arylate-series resin or a saturated aromatic polyester-series resin. The aromatic polyester-series resin includes, for example, a polyalkylene arylate-series resin [e.g., a poly$C_{2-4}$alkylene terephthalate such as polyethylene terephthalate (PET) and polybutylene terephthalate (PBT); a poly$C_{2-4}$alkylene naphthalate corresponding to the polyalkylene terephthalate (e.g., polyethylene naphthalate); 1,4-cyclohexyldimethylene terephthalate (PCT)]; a polyarylate-series resin (e.g., a polyarylate resin) obtained by polycondensation of a bisphenol (e.g., bisphenol A) and an aromatic dicarboxylic acid (e.g., terephthalic acid); and a fully aromatic or liquid crystalline aromatic polyester (e.g., a liquid crystalline polyester using p-hydroxybenzoic acid). The polyester-series resin may be a copolyester comprising an alkylene arylate unit as a predominant or main component (e.g., not less than 50% by weight), and a copolymerizable component may be exemplified a $C_{2-6}$alkylene glycol such as ethylene glycol, propylene glycol, butanediol, and hexanediol; a polyoxy$C_{2-4}$alkylene glycol; an asymmetrical aromatic dicarboxylic acid or an acid anhydride thereof such as phtalic acid, isophtalic acid; and an aliphatic dicarboxylic acid such as adipic acid. Moreover, a branched structure may be introduced into a linear polyester by using or modifying with small amounts of polyol and/or polycarboxylic acid component.

(3) A Poly(thio)ether-series Resin

The poly(thio)ether-series resin includes a polyoxyalkylene-series resin, a polyphenylene ether-series resin, a polysulfide-series resin (polythioether-series resin), and a polyether ketone-series resin. As examples of the polyoxyalkylene-series resin, there may be mentioned a polyoxy$C_{1-4}$alkylene glycol such as polyloxymethylene glycol, polyoxyethylene glycol, polyoxypropylene glycol, a polyoxyethylene-polyoxypropylene block-copolymer, and polyoxytetramethylene glycol, and the like. Preferred examples of the polyether-series resin include a polyacetal-series resin, a polyphenylene ether-series resin, a polysulfide-series resin, and a polyether ketone-series resin.

(3a) A Polyacetal-series Resin

The polyacetal-series resin may be a homopolymer (homopolymer of formaldehyde), or a copolymer (e.g., a copolymer of trioxane with ethylene oxide and/or 1,3-dioxolane). Moreover, an end or terminal of the polyacetal-series resin may be blocked or capped to be stablized.

(3b) A Polyphenylene Ether-series Resin

The polyphenylene ether-series resin includes various resins comprising 2,6-dimethylphenylene oxide as a main component, for example, a copolymer of 2,6-dimethylphenylene oxide and a phenol, a modified resin in which blending or being grafted with a styrenic resin, and so on.

(3c) A Polysulfide-series Resin (Polythioether-series Resin)

The polysulfide-series resin is not particularly restricted to a specific resin so far as the resin has a thio group (—S—) in the polymer chain. Such a resin includes, for example, a polyphenylene sulfide resin, a polydisulfide resin, a polybiphenylene sulfide resin, a polyketone sulfide resin, a polythioether sulfone resin, and the like. Moreover, the polysulfide-series resin may have a substituent such as an amino group, including a poly(aminophenylene sulfide). The preferred polysulfide-series resin includes a polyphenylene sulfide resin.

(3d) A Polyether Ketone-series Resin

The polyether ketone-series resin includes, for example, a polyether ketone-series resin obtained by a polycondensation between a dihalogenobenzophenone (e.g., dichlorobenzophenone) and a dihydrobenzophenone, a polyether-ether ketone-series resin obtained by a polycondensation between a dihalogenobenzophenone and a hydroquinone, etc.

(4) A Polycarbonate-series Resin

As the polycarbonate-series resin, an aliphatic polycarbonate-series resin may be used, and an aromatic polycarbonate-series resin, for example, an aromatic polycarbonate obtained by a reaction between an aromatic dihydroxy compound (e.g., a bisphenol compound such as bisphenol A and bisphenol S) and a phosgene or a diester carbonate (e.g., a diaryl carbonate such as a diphenyl carbonate, a dialkyl carbonate such as a dimethyl carbonate), etc can be usually used.

(5) A Polyimide-series Resin

The polyimide-series resin includes a thermoplastic polyimide-series resin, for example, a polyimide-series resin obtained by a reaction between an aromatic tetracarboxylic acid or an anhydride thereof (e.g., benzophenone tetracarboxylic acid) and an aromatic diamine (e.g., diaminodiphenylmethane), a polyamide imide resin, a polyester imide resin, etc.

(6) A Polysulfone-series Resin

The polysulfone-series resin includes, for example, a polysulfone resin obtained by a polycondensation of a dihalogenodiphenyl sulfone (e.g., dichlorodiphenyl sulfone) and a bisphenol (e.g., bisphenol A or a metal salt thereof), a polyether sulfone resin, a polyallyl sulfone resin (e.g., a commercial product "RADEL"), etc.

(7) A Polyolefinic Resin

The polyolefinic resin includes, for example, a homopolymer or copolymer of an olefin such as a polyethylene, a polypropylene, an ethylene-propylene copolymer, a poly (methylpentene-1); a copolymer of an olefin and a copolymerizable monomer (e.g., an ethylene-vinyl acetate copolymer, an ethylene-(meth)acrylic acid copolymer, an ethylene-(meth)acrylate copolymer). These polyolefinic resins can be used singly or in combination.

Preferred examples of the polyolefinic resin includes a polypropylene-series resin having a propylene content of not less than 50% by weight (in particular, 75 to 100% by weight), for example, polypropylene, propylene-ethylene copolymer, propylene-butene copolymer, propylene-ethylene-butene copolymer, and soon. Moreover, the polyolefinic resin preferably has a crystallinity.

(8) A Halogen-containing Vinyl-series Resin

As the halogen-containing vinyl-series resin, there are included, for example, a chlorine-containing vinyl-series resin such as a polyvinyl chloride, a polyvinylidene chloride, a copolymer of vinyl chloride and vinyl acetate, and a copolymer of vinylidene chloride and vinyl acetate; a fluorine-containing vinyl-series resin such as a polyvinyl fluoride, a polyvinylidene fluoride, a polychlorotrifluoroethylene, and a copolymer of tetrafluoroethylene and a copolymerizable monomer. The preferred halogen-containing vinyl-series resin is the fluorine-containing vinyl-series resin (e.g., the polyvinyl flouride, the polyvinylidene flouride).

(9) A Styrenic Resin

As the styrenic resin, there are exemplified with a homopolymer or copolymer of a styrenic monomer (e.g., a polystyrene, a styrene-vinyl toluene copolymer, a styrene-α-methylstyrene copolymer), a copolymer of a styrenic monomer and a copolymerizable monomer [e.g., a styrene-acrylonitrile copolymer (AS resin), a acrylonitrile-butadiene-styrene copolymer (ABS resin), a (meth)acrylate-styrene copolymer (MS resin), a styrene-meleic anhydride copolymer, a styrene-butadiene copolymer], a high-impact polystyrene (HIPS), etc.

(10) A (meth)acrylic Resin

The (meth)acrylic resin includes a homopolymer or copolymer of a (meth)acrylic monomer, a copolymer of a (meth)acrylic monomer and a copolymerizable monomer, and so on. The (meth)acrylic monomer may include, for example, (meth)acrylic acid, a $C_{1-10}$alkyl (meth)acrylate such as methyl (meth)acrylate, ethyl (meth)acrylate, a iso-propyl (meth)acrylate, butyl (meth)acrylate, and 2-ethylhexyl (meth)acrylate; a $C_{5-10}$cycloalkyl (meth) acrylate such as cyclohexyl (meth)acrylate; a $C_{6-10}$aryl (meth)acrylate such as phenyl (meth)acrylate; a hydroxy$C_{2-10}$alkyl (meth)acrylate such as hydroxyethyl (meth)acrylate; a (meth)acrylamide; and a (meth)acrylonitrile; a glycidyl (meth)acrylate. The copolymerizable monomer includes a vinyl-series monomer such as vinyl acetate and vinyl chloride, a styrenic monomer such as styrene and α-methylstyrene, and the like.

(11) A Polyurethane-series Resin

The polyurethane-series resin can be obtained by reacting a diisocyanate, a polyol and, if necessary, a chain-extension agent. As the diisocyanate, there are exemplified an aliphatic diisocyanate such as hexamethylene diisocyanate and 2,2,4-trimethylhexamethylene diisocyanate; an alicyclic diisocyanate such as 1,4-cyclohexane diisocyanate and isophorone diisocyanate; an aromatic diisocyanate such as a phenylene diisocyanate, a tolylene diisocyanate, and a diphenylmethane-4,4'-diisocyanate; an araliphatic diisocyanate such as a xylylene diisocyanate, and so on. The diisocyanate may be a compound having an alkyl group (e.g., methyl group) substituted on a main chain or a ring.

As a diol, there may be mentioned a polyester diol (e.g., a polyesterdiol derived from a $C_{4-12}$aliphatic dicarboxylic acid component such as adipic acid; a $C_{2-12}$aliphatic diol component such as ethylene glycol, propylene glycol, butanediol, and neopentyl glycol; a $C_{4-12}$lactone component such as ε-caprolactone), a polyether diol (e.g., a polyethylene glycol, a polypropylene glycol, a polyoxyethylene-polyoxypropylene block-copolymer, a polyoxytetramethylene glycol, a bisphenol A-alkylene oxide adduct), a polyester ether diol (a polyester diol in which the polyether diol is used as part of the diol component).

As the chain-extension agent, a $C_{2-10}$alkylene diol such as ethylene glycol and propylene glycol as well as a diamine can be used. The diamine includes, for example, an aliphatic diamine such as a linear- or branched-alkylenediamine having about 2 to 10 carbon atoms (e.g., ethylenediamine, trimethylenediamine, tetramethylenediamine, pentamethylenediamine, hexamethylenediamine, trimethylhexamethylenediamine, 1,7-diaminoheptane, 1,8-diaminooctane) and a linear- or branched-polyalkylenepolyamine (e.g., diethylenetriamine, triethylenetetramine, tetraethylenepentamine, dipropylenetriamine); an alicyclic diamine such as isophoronediamine, bis(4-amino-3-methylcyclohexyl) methane, and bis(aminomethyl)cyclohexane; and an aromatic diamine such as phenylenediamine, xylylenediamine, and diaminodiphenylmethane.

(12) A Thermoplastic Elastomer

The thermoplastic elastomer includes, for example, a polyamide-series elastomer (a copolymer comprising a polyamide as a hard segment and an aliphatic polyether as a soft segment), a polyester-series elastomer (a copolymer comprising a polyalkylene arylate as a hard segment and an aliphatic polyether or aliphatic polyester as a soft segment), a polyurethane-series elastomer (a copolymer comprising a polyurethane containing a short-chain glycol as a hard segment and an aliphatic polyether or an aliphatic polyester as a soft segment, for example, a polyester-urethane elastomer, a polyether-urethane elastomer, or the like), a polystyrenic elastomer (a copolymer comprising a polystyrenic block as a hard segment and a diene-polymer block or a hydrogenated thereof as a soft segment), a polyolefinic elastomer (e.g., a copolymer comprising a polystyrene or a polypropylene as a hard segment and an ethylene-propylene rubber or an ethylene-propylene-diene rubber as a soft segment; an olefinic elastomer comprising a hard segment and a soft segment which are different in crystallinity), a polyvinyl chloride-series elastomer, a fluorine-containing thermoplastic elastomer, and so on. As the aliphatic polyether, a (poly)oxyC$_{2-4}$alkylene glycol (e.g., a (poly) oxyethylene glycol, a (poly)oxytrimethylene glycol, a (poly) oxypropylene glycol, and a (poly)oxytetramethylene glycol, particularly, the polyoxyethylene glycol) can be used. As the aliphatic polyester, the polyesterdiol and the other mentioned in the item of the polyurethane-series resin can be used. These thermoplastic elastomers can be used singly or in combination.

When the thermoplastic elastomer is a block copolymer, a block structure is not particularly restricted, and may be a triblock structure, a multiblock structure, a star-shaped structure or another structure.

Preferred examples of the thermoplastic elastomer include polyamide-series elastomer, polyester-series elastomer, polyurethane-series elastomer, polystyrenic elastomer, and polyolefinic elastomer.

Moreover, in the present invention, as a thermoplastic resin constituting a resin member, a resin having a plurality of hydrogen atoms (active hydrogen atoms) highly active to a radical-generating agent or sulfur atoms (active sulfur atoms) (hereinafter, the hydrogen atom and sulfur atom are occasionally referred to as an active atom) may be used. Such a thermoplastic resin can increase an adhesion strength between a silicone rubber member and a resin member even if a vulcanization-activating agent is not used. That is, the thermoplastic resin can be selected depending on species of the radical-generating agent, and may contain for example, an active atom having not less than a given value (e.g., 0.006, and preferably 0.008) of an orbital interaction energy coefficient S represented by the following formula (1). The preferred value of the orbital interaction energy coefficient S of the active atom is about 0.006 to 0.06, and preferably about 0.007 to 0.05 (particularly about 0.01 to 0.045). The number of the active atom in the resin depends on a bonding position or site of a functional group having the active atom (e.g., an end or terminal, a branched chain, or a main chain), and may be, for example, not less than 2 (about 2 to 10000), preferably not less than 2.5 (about 2.5 to 5000), and more preferably not less than 3 (about 3 to 1000) as an average per the thermoplastic resin molecule. The number of the active atom per the thermoplastic resin molecule is usually about 2 to 100 (preferably about 2.5 to 50, more preferably about 3 to 25, and particularly about 3 to 20). The selection of thermoplastic resin fulfilled such conditions progresses a crosslinking reaction on an interface between a rubber component and a thermoplastic resin component in a vulcanization or curing of the rubber component to firmly or strongly bond each other.

$$S=(C_{HOMO,n})^2/|E_c-E_{HOMO,n}|+(C_{LUMO,n})^2/|E_c-E_{LUMO,n}| \quad (1)$$

wherein each of $E_c$, $C_{HOMO,n}$, $E_{HOMO,n}$, $C_{LUMO,n}$, and $E_{LUMO,n}$ represents a value calculated by the semiempirical molecular orbital method MOPACPM3, $E_c$ representing an orbital energy (eV) of a radical of the radical-generating agent, $C_{HOMO,n}$ representing a molecular-orbital coefficient of a highest occupied molecular orbital (HOMO) of an n-th hydrogen or sulfur atom constituting a constitutive unit of the thermoplastic resin; $E_{HOMO,n}$ representing an orbital energy (eV) of the HOMO; $C_{LUMO,n}$ representing a molecular-orbital coefficient of a lowest unoccupied molecular orbital (LUMO) of the n-th hydrogen or sulfur atom constituting the constitutive unit of the thermoplastic resin, and $E_{LUMO,n}$ representing an orbital energy (eV) of the LUMO.

MOPACPM3 represented by the formula (1) is one of molecular orbital (MO) methods. The molecular orbital method is one of approximations for discussing a molecular electron condition or state, and is classified into three main methods; an empirical method such as Huckel's rule, a semiempirical method enhancing an approximation of the Huckel's rule, and an nonempirical method determining strictly a molecular orbital function by only calculation. In recent years, with developing a computer system, the semiempirical method and the nonempirical method have been main methods. The molecular orbital method is a most convincible method correlating a molecular structure and chemical reactivity thereof. For example, when searching the term "molecular orbital method" as a keyword in JST Online Information System (JOIS), about 53000 of a registered number can be found (term: 1980 to 2000 May). The MOPACPM3 is the core of NDDO (Neglect of Diatomic Differential Overlap) method which is one of the semiempirical methods.

The MOPACPM3 is used for mainly studying a reaction of an organic compound, and is explained in many literatures and publications [e.g., "Molecular orbital method MOPAC guidebook" (Tsuneo Hirano, Kazutoshi Tanabe; Kaibundo, 1991), "Quantum Chemistry, 3rd revised edition" (Teijiro Yonezawa et al., Kagaku Dojin, 1983), "Calculation Chemistry guidebook" (translated by Eiji Osawa et al., written by Tim Clark, Maruzen, 1985)].

A constitutive unit (or basic unit) in the formula (1) means a modeling molecular structure comprising a polymer terminal and about 1 to 3 repeating unit(s). That is, it is difficult to calculate a molecular orbital for a polymer compound itself by MOPACPM3, since the polymer compound has too much numbers of atoms per molecule. Therefore, a calculation may be carried out for a modeling molecular structure (a constitutive unit or basic unit) comprising a polymer terminal and about 2 to 3 repeating units. For example, a molecular structure (repeating unit) of polybutylene terephthalate (PBT) is generally represented by a chemical formula "—(CH$_2$—CH$_2$—CH$_2$—CH$_2$—O—C(=O)—C$_6$H$_4$—C (=O)—O)$_n$—", and the calculation of a molecular orbital in the formula (1) may be conducted for "HO—CH$_2$—CH$_2$—CH$_2$—CH$_2$—O—C(=O)—C$_6$H$_4$—C(=O)—OH" as a constitutive unit.

The orbital interaction energy coefficient S represented by the formula (1) may be referred to as a reactive index, and is defined and explained in various publications. When a chemical reactivity is discussed, the orbital interaction energy coefficient S is used as a parameter for the chemical reactivity in general. For example, "Introduction of Frontier orbital theory" (p.72, Shinichi Yamabe, Satoshi Inagaki, Kodansha Scientific, 1989) describes that an orbital interaction energy coefficient S indicates a concept "Regarding to an interaction between two orbits, (a) a smaller energy difference between two orbits and (b) a larger overlap between two orbits make the interaction stronger". The formula (1) is based upon an idea of superdelocalizability (Sr) published at 1954 by Dr. Fukui given a Nobel prize (see "To use a molecular orbital method", p.71, Minoru Imoto, Kagaku Dojin, 1986), a formula similar to the formula (1) is reported from the concept of Sr on various publications and literatures.

Hereupon, it is important that the molecular orbital method is widely known in discussion of a molecular structure and chemical reactivity thereof. Therefore, an orbital interaction energy coefficient S (1/eV) defined by the following formula (1) does not represent a mere conceptual value, and represents a value meaning a parameter or properties of a material (e.g., a molecular weight, a functional group) for definition of the material.

The radical orbital energy $E_C$ (eV) of a radical-generating agent is preferably calculated based on a radical molecular structure with the use of MOPACPM3, and a predetermined value based on species of the radical-generating agent may be used for convenience. For example, the $E_C$ value of the radical-generating agent may be −8 eV for an organic peroxide, −5 eV for an azo compound, and −6 eV for a sulfur-containing organic compound excluding a sulfur.

As the hydrogen atom having a predetermined value (e.g., 0.006) or more of an orbital interaction energy coefficient S (an active hydrogen atom) in the case where the radical-generating agent comprises an organic peroxide, there may be mentioned, for example, a hydrogen atom constituting, an amino group (—$NH_2$) (e.g. a terminal amino group), an imino group (—NH—) (e.g., a main-chain or terminal imino group, —NH— of an amide group), a mercapto group (—SH), a methyl group (—$CH_3$), a methylene group (—$CH_2$—) (a methylene group adjacent to an electron-withdrawing or -attracting group, i.e., an active methylene group), and a methylidyne group (—CH=) (a main-chain or terminal methylidyne group), etc.

As the sulfur atom having a given value (e.g., 0.006) or more of an orbital interaction energy coefficient S (an active sulfur atom) in the case where the radical-generating agent comprises an organic peroxide, there may be mentioned, for example, a sulfur atom constituting a thio group (—S—), a mercapto group (—SH), an alkylthio group (e.g., a $C_{1-4}$alkylthio group such as a methylthio group, an ethylthio group), a sulfinyl group (—SO—), etc.

The methyl group includes, for example, a methyl group bonding to an alkylene chain, a cycloalkylene chain, or an aromatic ring; a methyl group bonding to an oxygen atom (e.g., a methyl group in a methoxy group). The methylene group may include, for example, a methylene group adjacent to an oxygen atom constituting a (poly)oxyalkylene unit such as a (poly)oxymethylene unit and a (poly)oxyethylene unit, and a methylene group adjacent to a nitrogen atom constituting an amino group or an imino group. The methylidyne group includes, for example, an α-positioned methylidyne group adjacent to an amino group or an imino group, and a methylidyne group α-positioned to an amino group in an aminocycloalkyl group.

It is sufficient that a thermoplastic resin has plural (e.g., not less than 2) active atoms as average per molecule. That is, the thermoplastic resin having an active atom is not usually constituted by a single molecule, and comprises a mixture of numerous molecules being partially different in a structure and a chain length. Therefore, all molecules of the thermoplastic resin are not required essentially to have a plurality of active atoms, and the number of an active atom as average per molecule is to be not less than 2 in calculating a plurality of predictable predominant constitutive or basic units. For example, the number of an active hydrogen atom constituting a polymer having a repeating unit —(NH—$(CH_2)_6$—NH—C(=O)—$(CH_2)_4$—C(=O))$_n$— (polyamide 66) may be calculated based on a modeling constitutive unit $NH_2$—$(CH_2)_6$—NH—C(=O)—$(CH_2)_4$—C(=O)—OH, and when a radical-generating agent comprises an organic peroxide, an active hydrogen atom comprises 2 hydrogen atoms of a terminal $NH_2$ group (that is, S is not less than 0.006). In this case, an average number N of an active hydrogen atom per polyamide 66 molecule can be calculated with the use of the following formula (2) from a ratio of a terminal $NH_2$ group and a terminal COOH group in a polymer (polyamide 66) as an aggregate;

$$N=2\times A \qquad (2)$$

wherein A represents an average number of a terminal $NH_2$ group per molecule.

For example, in a ratio of a terminal $NH_2$ group/terminal COOH group=1/1 (molar ratio) in the resin, the number A of the terminal $NH_2$ group per molecule is 1, and the number N of the active hydrogen atom per molecule is equal to 2. Moreover, in 1/2 (molar ratio) of terminal $NH_2$ group/terminal COOH group, the number A of the terminal $NH_2$ group per molecule shows 2/3, and the number N of the active hydrogen atom per molecule is 4/3.

In the case where the resin is a resin mixture comprising plural resins different in the number of an active atom, the number of an active atom in the resin mixture may be represented by an average number of an active atom in each resin. That is, the number of an apparent active atom in the resin mixture can be estimated by calculating respectively an average number of an active atom for each resin based on a constitutive unit, and averaging the calculated number of the active atom according to a proportion (weight ratio) of the plural resins. For example, when the resin mixture comprises (A) the above mentioned polyamide 66 (N=2) and (B) the above mentioned polyamide 66 (N=4/3), and the ratio of (A)/(B) (weight ratio) is 1/1, an average active atom number N can be counted as 5/3. Moreover, when the resin mixture comprises (A) the above mentioned polyamide 66 (N=2) and (C) a polyamide 66 having carboxyl group as all terminal groups (N=0) and the ratio of (A)/(C) (weight ratio) is 3/1, an average active atom number N per molecule of the resin mixture can be counted as 3/2.

A thermoplastic resin having such active atoms is not particularly restricted as far as there are a plurality of active atoms per molecule, and includes various resins, for example, a polyamide-series resin, a polyester-series resin, a poly(thio)ether-series resin (e.g., a polyacetal-series resin, a polyphenylene ether-series resin, a polysulfide-series resin), a polyolefinic resin, a polyurethane resin, a thermoplastic elastomer. Moreover, even when a resin does not have the plural active atoms mentioned above, the resin can be modified to a thermoplastic resin capable of firmly bonding to a rubber member by introducing an active atom into the resin.

Incidentally, the molecular weight of the thermoplastic resin having the active atoms is not particularly restricted. Even if a polymer having the plural active atoms per molecule, a concentration of the active atom in the polymer relatively decreases with increasing a molecular weight of the polymer to cause a lower crosslinking rate or density between a resin and a rubber. As a result, contribution of the active atom relative to a bonding of the members deteriorates sometimes. Therefore, a resin having a low molecular weight is advantageous for bonding the members. In the present invention, a number-average molecular weight of a resin is usually about 3000 to 400000, preferably about 5000 to 100000, and more preferably about 5000 to 50000, for example, about 8000 to 20000.

A polyamide-series resin includes the resins mentioned in the item of (1) polyamide-series resin, etc. In the polyamide-series resin, an active hydrogen atom includes, for example, a hydrogen atom of a terminal amino group, a hydrogen atom bonding to an α-positioned carbon atom relative to a terminal amino group, a hydrogen atom bonding to a carbon atom adjacent to a group —NH— of an amide bond (e.g., a hydrogen atom of a methylene group, a hydrogen atom of a methylidyne group), in particular the hydrogen atom of the terminal amino group.

In the polyamide-series resin, the proportion of a terminal $NH_2$ group relative to a terminal COOH group is not particularly restricted, and maybe, for example, selected from the range of about 10/90 to 100/0, preferably about 20/80 to 100/0, and more preferably about 25/75 to 100/0 as a molar ratio of terminal amino group/terminal carboxyl group, when the active hydrogen atom comprises a hydrogen atom of the terminal amino group and a hydrogen atom of the α-positioned carbon atom. Moreover, in the case where the active hydrogen atom comprises only hydrogen atoms of the terminal amino group, the ratio (molar ratio) of terminal amino group/terminal carboxyl group, may be about 50/50 to 100/0, preferably about 60/40 to 100/0, and more preferably about 70/30 to 100/0.

A polyester-series resin includes the resins described in the heading of (2) polyester-series resin, particularly a polyalkylene arylate-series resin and a saturated aromatic polyester-series resin, etc.

In the case that the aromatic polyester-series resin has a lower concentration of the active atom relative to the predetermined concentration, a polyester-series resin modified with a modifying compound having the active atom (e.g., an aromatic polyester-series resin comprising at least one member selected from an amino group and an oxyalkylene group) may be used. As the compound having the active atom, particularly, an active hydrogen atom, there may be mentioned, for example, a polyamine [e.g., an aliphatic diamine such as a linear- or branched-alkylenediamine having about 2 to 10 carbon atoms, e.g., ethylenediamine, trimethylenediamine, propylenediamine, tetramethylenediamine, pentamethylenediamine, hexamethylenediamine, trimethylhexamethylenediamine, 1,7-diaminoheptane, and 1,8-diaminooctane; an alicyclic diamine such as isophorone diamine, bis(4-amino-3-methylcyclohexyl)methane, and bis(aminomethyl) cyclohexane; and an aromatic diamine such as phenylenediamine, xylylenediamine, and diaminodiphenylmethane]; and a polyol [e.g., a (poly)oxy$C_{2-4}$alkylene glycol such as a (poly)oxyethylene glycol, a (poly)oxytrimethylene glycol, a (poly)oxypropylene glycol, and a (poly)oxytetramethylene glycol]. The modification can be conducted by, for example, heating a mixture of a polyester resin and the modifying compound to cause an amidation, an esterification or an transesterification reaction. The degree of the modification of the polyester-series resin may depend on a concentration of the active hydrogen atom in the compound, and may be, for example, about 0.1 to 2 mol, preferably about 0.2 to 1.5 mol, and more preferably about 0.3 to 1 mol of the modified compound relative to 1 mol of a functional group (e.g., a hydroxyl group or a carboxyl group) of the polyester-series resin. In the transesterification reaction, the amount of the (poly)oxy$C_{2-4}$alkylene glycol may be about 1 to 50 parts by weight, and preferably about 5 to 30 parts by weight relative to 100 parts by weight of the polyester-series resin.

In the polyester-series resin, the active hydrogen atom usually comprises a hydrogen atom of methylene group adjacent to an oxygen atom of a (poly)oxyalkylene unit. In the modified polyester-series resin, an active hydrogen atom usually comprises a hydrogen atom of a terminal amino group, a hydrogen atom bonding to an α-positioned carbon atom relative to a terminal amino group, a hydrogen atom bonding to a carbon atom adjacent to a group —NH— of an amide bond (e.g., a hydrogen atom of a methylene group, a hydrogen atom of a methylidyne group), and particularly the hydrogen atom of the terminal amino group.

As a poly(thio)ester-series resin, there are mentioned, for example, the polyoxyalkylene-series resin (particularly, the polyacetal-series resin, the polyphenylene ether-series resin, and the polysulfide-series resin) among the resins described in the heading of (3) poly(thio)ester-series resin.

Referring to the polyacetal-series resin, an active hydrogen atom comprises, for example, a hydrogen atom of an oxymethylene unit, a hydrogen atom of an alkoxy group (particularly methoxy group) of a blocked terminal, and particularly the hydrogen atom of the oxymethylene unit. With respect to the polyphenylene ether-series resin, the active hydrogen atom comprises, for example, a hydrogen atom of a methyl group bonding to a benzene ring. Regarding the polysulfide-series resin, the active sulfur atom comprises a sulfur atom of a thio group in the main chain.

As a polyolefinic resin, there may be mentioned, for example, the resins mentioned in the heading of (7) polyolefinic resin, etc. In the polyolefinic resin, an active hydrogen atom represents, for example, a hydrogen atom in a methylene group as a main chain of a polyolefin, a hydrogen atom in a methyl group branched from the main chain, etc.

A polyurethane-series resin includes the resins mentioned in the head of (11) polyurethane-series resin. In the polyurethane-series resin, an active hydrogen atom comprises, for example, a hydrogen atom of an alkyl group bonding to a main chain or a ring of the diisocyanate (particularly a hydrogen atom at a benzyl position), a hydrogen atom in an alkylene group of a polyol or a polyoxyalkylene glycol, a hydrogen atom in an amino group of the chain-extension agent, etc.

A thermoplastic elastomer includes the resins described in the item of (12) thermoplastic elastomer. In the thermoplastic elastomer, an active hydrogen atom may comprise, for example, a hydrogen atom in an oxyalkylene unit of a soft segment.

With respect to a thermoplastic resin having an active atom, when a thermoplastic resin has the active atom in the insufficient amount to meet the predetermined concentration, the thermoplastic resin introduced or modified with the active atom mentioned above (or an amino group, an oxyalkylene group, a mercapto group, etc) may be used for producing a composite. As such a thermoplastic resin (a resin having an active atom in an insufficient amount for satisfying a predetermined concentration), there are mentioned, for example, a vinyl polymerization-series resin [e.g., a resin described in the heading of (10) (meth)acrylic resin (e.g., a polymethyl methacrylate, a copolymer of methyl methacrylate and styrene (MS resin)), a resin in the heading of (9) styrenic resin (e.g., a polystyrene; a styrenic copolymer such as an AS resin and a copolymer of styrene and methyl methacrylate; a styrenic graft copolymer such as a HIPS and an ABS resin), a homopolymer of copolymer of a halogen-containing monomer (e.g., a resin mentioned in the head of (8) halogen-containing vinyl-series resin such as a polyvinyl chloride and a polyvinylidene chloride), a vinyl-series resin (e.g., a polyvinyl acetate, a polyvinyl alcohol)], a condensation-series resin [e.g., a resin in the head of (4) polycarbonate-series resin (e.g., a bisphenol A-based polycarbonate-series resin), a resin described in the item of (5) polyimide-series resin, a resin described in the item of (6) polysulfone-series resin (e.g., a polyether sulfone-series resin), a resin in the heading of (3d) polyether ketone-series resin (e.g., a polyether ketone-series resin, a polyether ether ketone-series resin), a polyarylate-resin in the heading of (2) polyester-series resin, etc].

In the vinyl polymerization-series resin, a modified resin may be obtained by copolymerization of a vinyl monomer and a monomer containing a carboxyl group or an acid anhydride group such as (meth)acrylic acid and maleic anhydride to introduce a carboxyl group or an acid anhydride group into the vinyl polymerization-series resin, and, if necessary, reacting the resulting resin with thionyl chloride to produce an acid chloride group, and reacting the resultant with ammonia, a mono-substituted amine (e.g., a monoalkylamine, a monoarylamine) or the diamine mentioned above to introduce an amino group into the resin. Further, a copolymerization of (poly)oxyalkylene glycol mono(meth)acrylate of a (poly)oxyalkylene glycol monoalkylether (meth)acrylate with the vinyl monomer, or a graft-polymerization of the mono(meth)acrylate to the vinyl polymerization-series resin may introduce the active hydrogen atom for a modification of the vinyl polymerization-series resin.

Further, for the condensation-series resin as well as the vinyl polymerization-series resin, a modification may be carried out by graft-polymerizing a carboxyl group- or an acid anhydride group-containing monomer with a resin to introduce the carboxyl group or the acid anhydride group, if necessary, by reacting the resulting resin with thionyl chloride to produce an acid chloride group, and by reacting the acid chloride group with ammonia, a mono-substituted amine, or the diamine mentioned above to introduce an amino group as same manner as in the above vinyl polymerization-series resin.

The resin member among the resins (1) to (12) may comprise a resin having a small amount (or none) of an active atom, and may comprise a thermoplastic resin having the active atom in the predetermined concentration, and may comprise a resin having a small amount of the active atom and a resin having a predetermined active atom in combination.

The amount of the thermoplastic resin having the active atom may be about 30 to 100% by weight, preferably about 50 to 100% by weight, and more preferably about 80 to 100% by weight based on the total amount of the resin components.

The resin composition for the resin member may comprise various additives, for example, a filler or reinforcer, a stabilizer (an ultraviolet ray absorber, an antioxidant, a heat stabilizer), a colorant, a plasticizer, a lubricant, a flame retardant, an antistatic agent, and other conventional additives.

Silicone Rubber Member

A silicone rubber member of the present invention may comprise a vulcanizable or crosslinkable silicone-series rubber and a radical-generating agent as a vulcanizing agent or crosslinking agent. The silicone-series rubber means an organopolysiloxane comprising an unit represented by a formula $R_a SiO_{(4-a)/2}$. In the formula, R represents, for example, a $C_{1-10}$alkyl group such as methyl, ethyl, propyl, butyl, pentyl, and hexyl groups; a halogenated $C_{1-10}$alkyl groups such as 3-chloropropyl group and 3,3,3-trifluoropropyl group; a $C_{2-10}$alkenyl group such as vinyl, allyl, butenyl, pentenyl, and hexenyl groups; a $C_{6-12}$aryl group such as phenyl, tolyl, xylyl, and naphthyl groups; a $C_{3-10}$cycloalkyl group such as cyclopentyl group and cyclohexyl groups; a $C_{6-12}$aryl-$C_{1-4}$alkyl group such as benzyl group and phenethyl groups; etc. The coefficient a is about 1.9 to 2.1 in the formula. The preferred R is methyl group, phenyl group, alkenyl group (e.g., vinyl group), and fluoro$C_{1-6}$alkyl group.

A molecular structure of the silicone rubber is usually linear. The molecular structure may have a branched structure partially, and may be branched. A main chain of the silicone rubber can comprise for example, a poly(dimethylsiloxane) chain, a poly(methylvinylsiloxane) chain, a poly(methylphenyl siloxane) chain, a copolymer chain of the above mentioned siloxane unit (e.g., a dimethylsiloxane-methylvinylsiloxane copolymerized chain, a dimethylsiloxane-methylphenylsiloxane copolymerized chain, a dimethylsiloxane-methyl(3,3,3-trifluoropropyl) siloxane copolymerized chain, a dimethylsiloxane-methylvinyl siloxane-methylphenylsiloxane copolymerized chain). Both terminals of the silicone rubber may be, for example, trimethylsilyl group, dimethylvinylsilyl group, silanol group, a tri$C_{1-2}$alkoxysilyl group, etc.

Such silicone-series rubber includes not only a solid rubber of a High Temperature Vulcanizable (HTV) silicone rubber but also a liquid or paste-like rubber of a Room Temperature Vulcanizable (RTV) silicone rubber or Low Temperature Vulcanizable (LTV) silicone rubber.

The solid rubber among silicone rubbers (Q) includes, for example, a methylsilicone rubber (MQ), a vinylsilicone rubber (VMQ), a phenylsilicone rubber (PMQ), a phenylvinylsilicone rubber (PVMQ), a fluorosilicone rubber (FVMQ), and the like. These silicone rubbers can be used singly or in combination.

The silicone rubber can be selected depending on a use of a resin-silicone rubber composite, and may be an unvulcanized silicone rubber having an unsaturated bond of 2 or more (e.g., about 2 to 10) on average per molecule of unvulcanized silicone rubber, preferably about 2.5 to 7, and more preferably about 2.5 to 5 (e.g., about 2.5 to 4) to obtain a high adhesive strength between a resin member and a rubber member in the composite. Too much unsaturated bonds make a rubber too hard, and less than 2 unsaturated bonds sometimes give an insufficient adhesive strength of the composite depending on the species of a thermoplastic resin (e.g., a resin having an active atom in a low concentration).

As the polyorganosiloxane in the silicone rubber, there are exemplified a polyorganosiloxane having a double bond concentration of about 2 to 540 mmol/kg, preferably about 3 to 300 mmol/kg, and more preferably about 4 to 100 mmol/kg. The polyorganosiloxane may be a single kind of polyorganosiloxane, and may be a mixture of plural kinds of polyorganosiloxanes (e.g., a mixture of plural polymers different in polymerization degree).

When plural polyorganosiloxanes are used, the double bond concentration can be calculated from each double bond concentration of the plural polyorganosiloxanes and a composition ratio of the plural polyorganosiloxanes, etc. An average polymerization degree of the polyorganosiloxane can be selected suitably. In the case of a polyorganosiloxane having a low polymerization degree, the average polymerization degree may be, for example, about 3 to 500, and preferably about 3 to 200, and in the case of a polyorganosiloxane having a high polymerization degree, the average polymerization degree may be, for example, about 500 to 12000, and preferably about 1000 to 7000. When a plurality of polyorganosiloxanes different in the polymerization degree are used, a proportion of a polyorganosiloxane of low polymerization degree to a polyorganosiloxane of high polymerization degree depends on properties of a cured silicone rubber obtained by vulcanization, and the former/the latter (weight ratio) is about 1/99 to 50/50, preferably about 1/99 to 10/90, and more preferably about 2/98 to 7/93.

Further, a silicone rubber composition often comprises a polyorganohydrodienesiloxane having a hydrogen atom directly bonded to a silicon atom of not less than 2 on average per molecule. An added amount of the polyorganohydrodienesiloxane is not more than 4 parts by weight (e.g., 0.1 to 4 parts by weight), preferably not more than 3 parts by weight, and more preferably not more than 2 parts by weight, relative to 100 parts by weight of the polyorganosiloxane as a main component.

If necessary, the silicone-series rubber may be used in combination with other rubbers. As the other rubbers, there are mentioned, for example, a diene-series rubber [e.g., a polymer of a diene-series monomer such as NR, IR, IIR, BR, and CR; an acrylontrile-diene copolymerized rubber such as NBR, NCR, and NIR; a styrene-diene copolymerized rubber such as SBR, SCR, and SIR], an olefinic rubber (e.g., EPM, EPDM, polyoctenylene rubber), an acrylic rubber (e. g., a rubber composed of an alkyl acrylate as a main component such as a copolymer ACM of an alkyl acrylate and a chlorine-containing crosslinkable monomer, a copolymer ANM of an alkyl acrylate and acrylonitrile, a copolymer of an alkyl acrylate and a carboxyl group and/or an epoxy group-containing monomer, an ethylene acrylic rubber), a fluorine-containing rubber (e.g., a copolymer FKM of vinylidene fluoride and perfluoropropene, if necessary, tetrafluoroethylene; a copolymer of tetrafluoroethylene and propylene; a copolymer FFKM of tetrafluoroethylene and perfluoromethyl vinylether), a urethane-series rubber (e.g., a polyester-based urethane elastomer, a polyether-based urethane elastomer), an epichlorohydrin rubber (e.g., a homopolymer CO of epichlorohydrin, a copolymer ECO of epichlorohydrin and ethylene oxide, a copolymer of further copolymerized allyl glycidyl ether), a chlorosulfonated polyethylene, a propylene oxide rubber (GPO), a copolymer EAM of ethylene and vinyl acetate, a polynorbornene rubber, a modified rubber of the above mentioned rubber [e.g., an acid-modified rubber containing a carboxyl group or an acid anhydride group such as a carboxylated styrene butadiene rubber (X-SBR), a carboxylated nitrile rubber (X-NBR), and a carboxylated ethylene propylene rubber (X-EP(D)M)], etc.

Radical Generating Agent

A radical generating agent can not only vulcanize (or crosslink) the above mentioned silicone rubber but adheres a thermoplastic resin to a vulcanized silicone rubber adhered. As the radical generating agent, various radical generating agents can be used depending on the species of the above mentioned thermoplastic resin, and can be selected from, for example, an organic peroxide, an azo compound, and so on. The radical generating agent can be used singly or in combination.

The organic peroxide includes, for example, a diacyl peroxide (e.g., lauroyl peroxide, benzoyl peroxide, 4-chlorobenzoyl peroxide, 2,4-dichlorobenzoyl peroxide), a dialkyl peroxide [e.g., di-t-butyl peroxide; 2,5-di(t-butylperoxy)-2,5-dimethylhexane; 1,1-bis(t-butylperoxy)-3,3,5-trimethylcyclohexane; 2,5-di(t-butylperoxy)-2,5-dimethylhexane-3, 1,3-bis(t-butylperoxyisopropyl) benzene; dicumyl peroxide], an alkyl peroxide (e.g., t-butyl hydroperoxide, cumene hydroperoxide, 2,5-dimethylhexane-2,5-dihydroperoxide, diisopropylbenzene hydroperoxide), an alkylidene peroxide [e.g., ethylmethylketone peroxide, cyclohexanone peroxide, 1,1-bis(t-butylperoxy)-3,3,5-trimethylcyclohexane], a peracid ester (e.g., t-butyl peracetate, t-butyl perpivalate), etc. The azo compound includes azoisobutylonitrile and other compound.

As the radical-generating agent, a photopolymerization initiator also may be employed as far as a photoirradiation can be applied to an adhesion between the resin member and the rubber member. The photopolymerization initiator or photoinitiator may include, for example, a benzophenone or a derivative thereof (e.g., 3,3'-dimethyl-4-methoxybenzophenone, 4,4-dimethoxybenzophenone), an alkylphenylketone or a derivative thereof [e.g., acetophenone, diethoxyacetophenone, 2-hydroxy-2-methyl-1-phenylpropan-1-on, benzyldimethylketal, 1-hydroxycyclohexylphenylketone, 2-benzyl-2-dimethylamino-1-(morpholinophenyl)-butanone], an anthraquinone or a derivative thereof (e.g., 2-methyl anthraquinone), a thioxanthone or a derivative thereof (e.g., 2-chlorothioxanthone, an alkylthioxanthone), a benzoin ether or a derivative thereof (e.g., benzoin, a benzoin alkyl ether), a phosphine oxide or a derivative thereof, and others. The radical-generator also includes a persulfate (e.g., ammonium persulfate, potassium persulfate).

Among these radical-generating agents, the preferred agent is the organic peroxide.

The ratio of the radical-generating agent can be selected within a range of, for example, about 0.5 to 15 parts by weight, and is usually about 1 to 10 parts by weight, and preferably about 1 to 8 parts by weight (e.g., about 2 to 7 parts by weight) relative to 100 parts by weight of an unvulcanized silicone rubber.

Vulcanization-activating Agents or Activators

In the present invention, a vulcanization-activating agent (hereinafter may be sometimes referred to as a hardening agent) may be used together with the radical-generating agent in order to enhance an adhesion efficiency by the radical-generating agent. The vulcanization-activating agent accelerates not only a vulcanization of rubbers but also a crosslinking between the rubber molecule and the resin molecule to bond firmly the rubber member and the resin member. For example, when a thermoplastic resin comprises a polyphenylene ether resin, use of a radical-generating agent and a vulcanization-activating agent in combination progresses a crosslinking reaction between the resin member and the rubber member to ensure the bonding of the members firmly or strongly. The amount of the vulcanization-activating agent may be an amount required for the acceleration of rubber vulcanization and the crosslinking formation between rubbers and resins, and an excess amount of the activating agent may deteriorate a rubber's property. Therefore, an appropriate amount of vulcanization-activating agent can be selected suitably.

As the vulcanization-activating agent, there may be mentioned, for example, an organic compound having a carbon-carbon double bond (a polymerizable unsaturated bond) [e.g., a vinyl-series monomer (e.g., divinylbenzene), an allyl-series monomer (e.g., a diallyl phthalate, a triallyl phosphate, a triallyl (iso)cyanurate, a (meth)acrylic monomer], a maleimide-series compound, and other unsaturated compounds. These vulcanization-activating agents (activators) can be used singly or in combination. As the vulcanization-activating agent, a polyfunctional vulcanization-activating agent having the polymerizable unsaturated bond of not less than 2 is practically used.

Examples of the (meth)acrylic monomer include a bifunctional (meth)acrylate [e.g., a $C_{2-10}$alkylene glycol di(meth) acrylate such as ethylene glycol di(meth)acrylate, propylene glycol di(meth)acrylate, 1,4-butanediol di(meth)acrylate, hexanediol di(meth)acrylate, and neopentyl glycol di(meth) acrylate; a poly$C_{2-4}$alkylene glycol di(meth)acrylate such as diethylene glycol di(meth)acrylate, triethylene glycol di(meth)acrylate, polyethylene glycol di(meth)acrylate, dipropylene glycol di(meth)acrylate, tripropylene glycol di(meth)acrylate, polypropylene glycol di(meth)acrylate, and polytetramethylene glycol di(meth)acrylate; glycerol di(meth)acrylate; trimethylolpropane di(meth)acrylate; pentaerythritol di(meth) acrylate; and di(meth)acrylate of bisphenol A-C$_{2-4}$ alkylene oxide-adduct], a tri- or polyfunctional (meth)acrylate [e.g., glycerol tri(meth)acrylate, trimethylolethane tri(meth)acrylate, trimethylolpropane tri(meth)acrylate, pentaerythritol tri(meth)acrylate, pentaerythritol tetra(meth)acrylate, dipentaerythritol tetra(meth)acrylate, dipentaerythritol hexa(meth)acrylate].

A maleimide-series compound having a plurality of maleimide groups can be obtained by a reaction of a polyamine with a meleic anhydride. Examples of the maleimide-series compound include an aromatic bismaleimide [e.g., N,N'-1,3-phenylenedimaleimide, N,N'-1,4-phenylenedimaleimide, N,N'-(3-methyl-1,4-phenylene)dimaleimide, 4,4'-bis(N,N'-maleimide)diphenylmethane, 4,4'-bis(N,N'-maleimide)diphenyl sulfone, 4,4'-bis(N,N'-maleimide)diphenyl ether], an aliphatic bismaleimide (e.g., N,N'-1,2-ethylenebismaleimide, N,N'-1,3-propylenebismaleimide, N,N'-1,4-tetramethylenebismaleimide), etc.

The preferred vulcanization-activating agent includes a compound having a plurality (e.g., about 2 to 6, particularly about 3 to 6) of a carbon-carbon double bond (polymerizable unsaturated bond) per molecile, for example, a triallyl (iso)cyanurate, a di- or poly-functional (meth)acrylate (in particular, tri- or poly-functional (meth)acrylate), and an aromatic maleimide compound.

Incidentally, the vulcanization-activating agent usually has a plurality of polymerizable unsaturated bonds (e.g., vinyl group, allyl group, (meth)acryloyl group). For example, in the combination of a polyester-series resin and a rubber, an unsaturated compound having a plurality of vinyl groups, allyl groups, or (meth)acryloyl groups in preference to the maleimide compound is used in many cases.

In the present invention, the addition of the vulcanization-activating agent is not essential. For example, depending on the number of an active atom of a thermoplastic resin and species of a silicone rubber material to be used, the presence of the vulcanization-activating agent is not required to bond both members. In practical cases, however, in order to ensure firmly bonding of the rubber member and the resin member, the vulcanization-activating agent is advantageously added. The vulcanization-activating agent may be added to at least one component selected from the unvulcanized rubber (or unvulcanized rubber composition) and the thermoplastic resin (or a resin composition), and may be added to both components. The vulcanization-activating agent is usually added to at least the unvulcanized rubber. Especially, an addition of the vulcanization-activating agent to at least thermoplastic resin (or a resin composition) can achieve firm adhesion between a rubber member and a resin member in a wide range combination. The amount of the vulcanization-activating agent is varied depending on species of the vulcanization-activating agent and species of the component to be added (the unvulcanized rubber and/or the thermoplastic resin), and is usually an effective amount for accelerating an adhesion or bonding between the thermoplastic resin and the rubber, for example, about 0.1 to 10 parts by weight, preferably about 0.1 to 5 parts by weight, and more preferably about 0.1 to 3 parts by weight, relative to 100 parts by weight of at least one component selected from the rubber and the resin. For example, in the case where the vulcanization-activating agent comprises a methacrylate of a polyhydric alcohol, the amount of the vulcanization-activating agent is about 0.1 to 10 parts by weight, preferably about 0.1 to 5 parts by weight, more preferably about 0.1 to 3 parts by weight, and practically about 0.1 to 1.9 parts by weight (e.g., 0.5 part by weight, 1.0 part by weight), relative to 100 parts by weight of the rubber or the resin. Moreover, in the case that the vulcanization-activating agent is added both of the thermoplastic resin and the rubber, a small amount of the vulcanization-activating agent may be added to the resin, and the vulcanizing activator may be used in a proportion of about 0.1 to 7 parts by weight, preferably about 0.1 to 5 parts by weight, and more preferably about 0.1 to 3 parts by weight, relative to 100 parts by weight of the resin.

An excess amount of the vulcanization-activating agent may significantly affect properties of the rubber member or the resin member, depending on species of the vulcanization-activating agent. For example, the addition of the excess amount of the vulcanization-activating agent to the rubber component causes troublesomeness, for example, a far higher hardness of a vulcanized rubber than a designed value, and significant deterioration in a long-term property of the rubber member such as a weather resistance. Moreover, the addition of the excess amount of the vulcanization-activating agent to the resin component causes a gel-formation accompanying with a resin member molding to make an appropriate molding difficulty, and a decrease of a mechanical strength. Further, the added vulcanization-activating agent may be migrated from the resin member.

Therefore, in any case of addition of the vulcanization-activating agent to the rubber component or the resin member, the exceeding amount of more than 10 parts by weight of the vulcanization-activating agent relative to 100 parts by weight of an added object (rubber or resin) is objectionable, and it should be carefully handled the amount of not less than 5 parts by weight, and thus, prior to practical usage, a consequence for the amount of the vulcanization-activating agent to the added object may have been examined. To obtain a sufficient bonding strength between the rubber member and the resin member without any considerations affecting the object to be added, the amount of the vulcanization-activating agent is, for the object comprising a rubber, not more than 2 parts by weight, for example, about 0.1 to 1.9 parts by weight (e.g., about 0.5 to 1.9 parts by weight) relative to 100 parts by weight of the rubber, and for the object comprising a resin, not more than 5 parts by weight, for example, about 0.1 to 5 parts by weight (e.g., about 3 to 5 parts by weight) relative to 100 parts by weight of the resin.

When the vulcanization-activating agent is added to the rubber, the proportion of the radical-generating agent and the vulcanization-activating agent (weight ratio) may be such that, for example, the former/the latter is equal to about 0.3/1 to 20/1 (e.g., about 0.5/1 to 20/1), preferably about 0.4/1 to 15/1 (e.g., about 1/1 to 15/1), and more preferably about 0.5/1 to 10/1 (e.g., about 2/1 to 10/1).

Incidentally, as described later, the vulcanization-activating agent is not essentially added to the rubber composition and/or the resin composition, and may be applied or coated on a bonding surface or site of the rubber member and/or the resin member.

Vulcanization Auxiliaries

In the present invention, to enhance the adhesion efficiency, a vulcanization auxiliary may be used. According to species of the rubber and the resin, an addition of the vulcanizing auxiliary make a bonding between a rubber member and the resin member firmly. The vulcanization auxiliary may be added to at least one component selected from an unvulcanized rubber (or an unvulcanized rubber composition) and a thermoplastic resin (or a resin composition), and may be added to both components. Usually, the vulcanization auxiliary may be added to the unvulcanized rubber.

The vulcanization auxiliary can be selected depending on species of the resin and the rubber, and includes, for example, an oligomer of a thermoplastic resin having a active hydrogen atom (e.g., an oligomer having a number-average molecular weight of about 100 to 1000 such as an oligomer of the polyamide-series resin and an oligomer of the polyester-series resin), a polyamine [e.g., the polyamine described in the heading of polyester-series resin having the active atom], a polyol [e.g., the polyol described in the heading of polyester-series resin having the active atom], a polycarboxylic acid or an acid anhydride thereof, a plural-aldehyde groups-containing compound, an epoxy compound, a nitrogen-containing resin (e.g., an amino resin), a methylol group- or alkoxymethyl group-containing compound, a polyisocyanate, and the like. These vulcanization auxiliaries may be used singly or in combination.

The preferred vulcanization auxiliary includes a compound having not less than 2 of an active hydrogen atom on the average per molecule, each hydrogen atoms having a predetermined value of an orbital interaction energy coefficient S represented by the formula (1), for example, the oligomer of the thermoplastic resin (e.g., the oligomer of the above mentioned polyamide-series resin and the oligomer of the polyester-series resin), the above mentioned polyamine, and the other.

The amount of the vulcanization auxiliary is, for example, about 0.1 to 30 parts of weight, preferably about 0.5 to 20 parts of weight, and about 1 to 15 parts of weight, relative to 100 parts of weight of the rubber and/or the resin.

Incidentally, as described later, the vulcanization auxiliary is not essentially added to the rubber composition and/or the resin composition, and may be applied or coated on a bonding surface or site of the rubber member and/or the resin member.

Other Additives

To the silicone rubber composition mentioned above may be added, if necessary, various additives, for example, a filler, a plasticizer or softening agent, a co-vulcanizing agent, an age resistor (e.g., a heat resistant, an antiozonant, an antioxidant, an ultraviolet ray absorber), a tackifier, a processing auxiliary, a lubricant, a colorant, a forming agent, a dispersant, a flame retardant, an antistatic agent, and so forth.

The filler (or reinforcer) includes, for example, a powdery or particulate filler or reinforcer (e.g., a mica, a clay, a talc, a silicic acid, a silica, a calcium carbonate, a magnesium carbonate, a carbon black, a ferrite), a fibrous filler or reinforcer (e.g., an organic fiber such as rayon, nylon, vinylon, and aramid; an inorganic fiber such as a carbon fiber and a glass fiber), and other fillers.

The most general filler as a reinforcer added to the silicone rubber is a powdered silica. The generally used silica is roughly classified into 2 types of a wet silica produced by a wetting method and a dry silica produced by a drying method. A powdered silica suitable for the present invention is the dry silica. The use of dry silica readily enhances a bonding strength between a resin member and a rubber member. When the wet silica is used, water in the wet silica seems to inhibit crosslinking between the resin member and the rubber member. However, the wet silica does not crucially inhibit bonding between the resin member and the rubber member, and even the wet silica can be used according to the species of a used resin and a used silicone rubber, the species of a vulcanization-activating agent and its amount, and a molding condition. A mixture of the dry silica and the wet silica is available.

The content of the filler may be, for example, about 0 to 300 parts by weight, preferably about 0 to 200 parts by weight, and more preferably about 0 to 100 parts by weight, relative to 100 parts by weight of the rubber.

Preferred embodiments of the present invention are as follows.

A Thermoplastic Resin:
   (1) a thermoplastic resin comprising a vulcanization-activating agent
   (2) a thermoplastic resin having an active atom in a predetermined concentration, which may comprise a vulcanization-activating agent A Silicone Rubber:
   (3) a silicone rubber having not less than 2 of unsaturated bonds on average per molecule and comprising a vulcanization-activating agent containing a polyfunctional polymerizable compound having a plurality of polymerizable groups
   (4) a silicone rubber having not less than 2 of unsaturated bonds on average per molecule and comprising a silica
   (5) a silicone rubber comprising a vulcanization-activating agent containing a polyfunctional polymerizable compound having a plurality of polymerizable groups, and a silica Between the thermoplastic resin and the silicone rubber, at least one component may comprise a vulcanization auxiliary.

Process for Producing a Composite

In the present invention, since a resin composition comprising a thermoplastic resin combines with an unvulcanized rubber composition comprising an unvulcanized silicone rubber and a radical-generating agent, a resin member comprising the thermoplastic resin can certainly and firmly bond to a rubber member comprising a vulcanized silicone rubber. Particularly, without a treatment for easy adhesion (e.g., a surface-activated treatment such as a corona discharge, a formation of an easily adhesive coating layer), the resin member can firmly bond to the rubber member. Further, there is not restricted in a two dimensional configuration, and even a three dimensional configuration is available for producing a composite of the resin member firmly bonded to the rubber member.

In the present invention, a composite of a resin member comprising the thermoplastic resin bonded to a rubber member comprising a vulcanized silicone rubber can be produced by use of a combination of the thermoplastic resin and an unvulcanized silicone rubber comprising a radical-generating agent. The composite (or resin/rubber composite) can be produced by molding a resin molding element or material and a rubber molding element or material with contacting each other and a vulcanizing or crosslinking the rubber molding member or element.

The resin molding element or material may be a resin composition comprising a thermoplastic resin, or a resin preformed or premolded member beforehand (or a resin shaped article). Moreover, the rubber molding element or material is not particularly restricted to a specific member as far as the rubber molding member or element has an active radical-generating agent on a surface contacted with the resin molding member or element and comprises at least an unvulcanized silicone rubber. The rubber molding element or material may be an unvulcanized silicone rubber composition, or a rubber preformed or premolded article (rubber molded precursor) having a partially vulcanized or crosslinked rubber.

That is, the composite may be produced by molding a resin composition comprising a thermoplastic resin (preferably a resin composition containing at least the vulcanization-activating agent) and an unvulcanized rubber composition comprising an unvulcanized silicone rubber and a radical-generating agent (preferably a unvulcanized rubber composition further comprising at least the vulcanization-activating agent) with contacting each other, and vulcanizing or crosslinking the unvulcanized rubber composition to bond or join the resin member and the rubber member.

Moreover, as far as the radical-generating agent is activated, at least one member selected from the resin member (or a shaped resin article) and the rubber member (or a shaped rubber article) may have been molded or formed beforehand. The examples of the molding technique are further illustrated as follows:

(1) a composite may be produced by contacting a resin member comprising a thermoplastic resin with an unvulcanized rubber composition, and then molding the unvulcanized rubber composition with vulcanizing or crosslinking the unvulcanized rubber composition.

(2) a composite may be produced by contacting a premolded rubber article (a precursor of intermediate) comprising a preliminarily vulcanized or crosslinked rubber composition with the resin composition mentioned above, and molding the resin composition in a desired shape.

(3) a composite may be produced by contacting a resin member comprising a thermoplastic resin with a premolded rubber article (a precursor) obtained by vulcanizing or crosslinking the rubber composition to be molded. Incidentally, the preformed rubber article has an activated radical-generating agent at least on a surface contacted with the resin molding member or element, and may have a residual radical-generating agent.

More concretely, the process of the present invention includes a process which comprises contacting or meeting (or converging) a resin composition with an unvulcanized rubber composition with molding the resin composition and the unvulcanized rubber composition respectively in a metal mold to bond or adhere directly the resin member and the vulcanized rubber member (one-step method); a process which comprises contacting a premolded or preformed resin member with an unvulcanized rubber composition, and molding the unvulcanized rubber composition by vulcanizing or crosslinking the unvulcanized rubber composition to join or bond the resin member and the vulcanized rubber member (two-step method); a process comprising a step for contacting a premolded resin member with a preformed rubber article produced by molding an unvulcanized rubber composition to the intermediate stage (partially vulcanized or crosslinked), and a step for vulcanizing or crosslinking the premolded rubber article to bond or adhere the resin member and the vulcanized rubber member (three-step method); and other molding methods.

The preferred process includes the one-step method and the two-step method (particularly the two-step method). In the one-step method, a composite molded article can be obtained by melting and kneading the resin composition and the unvulcanized rubber composition, respectively, injecting or extruding the molten and kneaded compositions into a metal mold having a desired cavity or configuration with use of, for example, a conventional multi-molding apparatus (e.g., a multi-injection molding apparatus, a multilayer extruder), and vulcanizing or crosslinking the unvulcanized rubber on or after the molding. The resin composition and the unvulcanized rubber composition may be mixed or mingled at or in the contact interface area between these compositions.

In the two-step method, a conventional molding apparatus (e.g., an injection molding apparatus, an extrusion molding apparatus, a thermal-press molding apparatus) can be used for forming the shaped resin member, and a conventional molding apparatus (e.g., an injection molding apparatus, a press molding apparatus, a transfer molding apparatus, an extrusion molding apparatus) can be used for forming the rubber member. In the molding process, a vulcanized rubber member and a resin member may be bonded or adhered by placing or setting a resin member into a mold (or a cavity) in conformity with a configuration of a composite, injecting or extruding an unvulcanized rubber composition to the resin member, and vulcanizing or crosslinking the unvulcanized rubber composition. Moreover, when the shape of the composite is a plate- or sheet-like member having a two-dimensional configuration, the composite may be produced by laminating a plate- or sheet-like unvulcanized rubber composition to a shaped resin member, and vulcanizing or crosslinking the unvulacanized rubber composition without the mold (or cavity). Incidentally, when contacting (e.g., closely contacting or adhering) a resin member (or a resin composition) with an unvulcanized rubber composition, a pressure molding may be conducted by applying a pressure suitably with use of a thermalpress molding or an injection molding, for example, under a reduced pressure in order to remove a volatile component or a gas component from the composition(s). Moreover, when the shape of the composite is a plate- or sheet-like member having a two-dimensional configuration, the composite may be produced by laminating a plate- or sheet-like unvulcanized rubber composition to a shaped resin member, and vulcanizing or crosslinking the unvulacanized rubber composition without the mold (or cavity). Incidentally, when contacting (e.g., closely contacting or adhering) a resin member (or a resin composition) with an unvulcanized rubber composition, a pressure molding may be conducted by applying a pressure suitably with use of a thermalpress molding or an injection molding, for example, under a reduced pressure in order to remove a volatile component or a gas component from the composition(s).

The vulcanization (or curing) or crosslinking temperature (or a bonding temperature between the rubber member and the resin member) can be selected, for example, from about 70 to 250° C., preferably about 100 to 200° C., and more preferably about 130 to 170° C. The pressure loaded to the rubber and the resin can be selected, for example, from within the range of about 0 to 350 MPa, preferably about 1 to 150 MPa, and more preferably about 2 to 100 MPa.

In the production process of the composite, at least one component selected from an unvulcanized silicone rubber and a thermoplastic resin may comprise a vulcanization-activating agent (e.g., a polymerizable compound having the above mentioned plural polymerizable groups) and a vulcanization auxiliary (e.g., a compound having not less than 2 of active hydrogen atoms mentioned above on average per molecule).

Moreover, as described above, the vulcanization-activating agent is usually incorporated into the unvulcanized rubber composition (or the rubber member), and the process of the present invention also includes a production process of a composite of the resin member bonded to the rubber member by molding the resin molding member or element and the rubber molding member or element under heating with interposing at least the vulcanization-activating agent (if necessary, further incorporation of the vulcanization auxiliary) on a contacting surface (or a bonding surface) between the resin molding member or element and the rubber molding member or element.

Further, the process of the present invention also includes a process for producing a composite by pressing or contacting a shaped resin member comprising a thermoplastic resin with a vulcanized rubber member under heating with interposing at least the vulcanization-activating agent (if necessary, further incorporation of the vulcanization auxiliary) on a contacting surface (or a bonding surface) between the resin member and the vulcanized rubber member to bond or adhere the resin member and the rubber member. In the preferred process, a shaped resin member or element of the thermoplastic resin is used in a combination with a shaped rubber member or element of the unvulcanized rubber composition. That is, a resin member comprising the thermoplastic resin is preferably combined with a vulcanized rubber member obtained from an unvulcanized rubber composition comprising at least a radical-generating agent and an unvulcanized rubber.

Furthermore, on an interface between the resin member and the vulcanized rubber member, a coating agent comprising at least the vulcanization-activating agent (if necessary, further the vulcanization auxiliary) may be interposed by a coating technique, and the coating agent may be a radically active agent comprising the radical-generating agent and the vulcanization-activating agent (if necessary, further the vulcanization auxiliary). The amount of the coating agent on the interface between the resin member and the vulcanized rubber member may, for example, be about 0.1 to 10 g/m$^2$, preferably about 0.5 to 5 g/m$^2$, and particularly about 1 to 5 g/m$^2$.

The composite of the resin member bonded to the vulcanized rubber member can be obtained by heating (in particular, heat-pressing) the resin member and the vulcanized rubber member with interposing the above mentioned coating agent between these members. The heating temperature and pressure can be selected within the range similar to the vulcanization or crosslinking temperature and pressure mentioned above.

Thus, the obtained composite has a markedly high adhesive strength between the rubber member and the resin member by vulcanization. Therefore, both properties of the thermoplastic resin and the rubber can be effectively expressed, and the obtained composite can be advantageously employed as various applications, for example, a sealing packing as a mechanical part or a machine element, a switch part as a electrical part, an automobile part, a rubber vibration isolator, a valve, an electrical plug, a pair of eyeglasses, and other parts or elements.

INDUSTRIAL APPLICABILITY

In the present invention, since a thermoplastic resin is combined with an unvulcanized silicone rubber comprising a radical-generating agent [particularly, a silicone rubber having not less than 2 of unsaturated bonds on average per molecule, a silicone rubber comprising a vulcanization-activating agent, a silicone rubber comprising a powdered or particulate silica (particularly a dry silica) as a reinforcer, etc], a thermoplastic resin molded article can directly and firmly bond to a silicone rubber molded article without using an adhesive or treating a surface of a thermoplastic resin. Moreover, an adhesive strength between the molded article composed of a thermoplastic resin and the molded article composed of a silicone rubber is excellent. Not only a composite of two dimensional configuration but also a composite of three dimensional configuration can be easily produced.

EXAMPLES

The following examples are intended to describe this invention in further detail and should by no means be interpreted as defining the scope of the invention. In Examples and Comparative examples, the following resin composition and rubber composition were used.

Resin Compositions (A) to (J)
Resin compositions A1 to A6

The following resin compositions (A1 to A6) were prepared by use of a polyamide 612 (a polycondensate of hexamethylenediamine and dodecanedicarboxylic acid) as a thermoplastic resin. A MOPACPM3 calculation was carried out for the following basic constitutive unit.

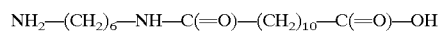

$NH_2-(CH_2)_6-NH-C(=O)-(CH_2)_{10}-C(=O)-OH$

Resin Composition (A1)
A polyamide 612 [terminal NH$_2$/terminal COOH=9/1 (molar ratio)]
Preparation A predetermined amount of hexamethylenediamine was added to 80% by weight aqueous solution of a salt of hexamethylenediamine with dodecanedicarboxylic acid, and the mixture was heated at 220° C. under an applied pressure (17.5 kg/cm$^2$) in an autoclave substituted with nitrogen gas to flow out water with nitrogen gas from the inside to the outside of the reaction system for 4 hours. Subsequently, the temperature of the system was gradually raised to 275° C. over 1 hour to discharge a residual water in the system, and the applied pressure of the autoclave was reduced to be an atmospheric pressure. After cooling the system, a polyamide 612 was obtained. The obtained polymer had a number average molecular weight (Mn) of about 20,000 and a ratio of terminal amino group/terminal carboxyl group=9/1. The polymer was used alone for Resin composition (A1).

Resin Composition (A2)
50% by weight of a polyamide 612 [terminal NH$_2$/terminal COOH=9/1 (molar ratio)]
50% by weight of a carbon staple (shorten-fiber)
Preparation Equal or equivalent amounts of Resin composition (A1) and a carbon fiber were kneaded by a biaxial extruder, and the kneaded one was used for Resin composition (A2).

Resin Composition (A3)
12% by weight of a polyamide 612 [terminal NH$_2$/terminal COOH=9/1 (molar ratio)]
88% by weight of a soft ferrite
Preparation 100 parts by weight of Resin composition (A1) and 733 parts by weight of a soft ferrite were kneaded by a kneader, and the resultant was used for Resin composition (A3).

Resin Composition (A4)
A polyamide 612 [terminal NH$_2$/terminal COOH=1/1 (molar ratio)]
Preparation An aqueous solution containing a salt of hexamethylenediamine with dodecanedicarboxylic acid in an amount of 80% by weight was heated at 220° C. under an applied pressure (17.5 kg/cm$^2$) in an autoclave substituted with nitrogen gas to flow out water with nitrogen gas from the reaction system for 4 hours. Subsequently, the temperature of the system was gradually increased to 275° C. over 1 hour to remove water remaining in the system, and the applied pressure of the autoclave was reduced to be an atmospheric pressure. After cooling the system, a polyamide 612 was obtained. The polymer had a molecular weight (Mn) of about 20000 to 25000, and a ratio of terminal amino group/terminal carboxyl group=1/1. The polymer was used alone for Resin composition (A4).

Resin Composition (A5)

A polyamide 612 [terminal $NH_2$/terminal COOH=3/7 (molar ratio)]

Preparation

A resin composition (A1) and the following resin composition (A6) were kneaded in a proportion of the former/the latter=1/3 (weight ratio) by a biaxial extruder. The obtained composition was used for Resin composition (A5).

Resin Composition (A6)

A polyamide 612 [terminal $NH_2$/terminal COOH=1/9 (molar ratio)]

Preparation

To an aqueous solution containing a salt of hexamethylenediamine with dodecanedicarboxylic acid in an amount of 80% by weight was added a predetermined amount of dodecanedicarboxylic acid, and the mixture was heated at 220° C. under an applied pressure (17.5 kg/cm$^2$) in an autoclave substituted with nitrogen gas to remove water with nitrogen gas from the reaction system for 4 hours. Subsequently, the temperature of the system was gradually elevated to 275° C. with taking 1 hour to discharge a residual water in the system, and the applied pressure of the autoclave was reduced to be an atmospheric pressure. After cooling, a polyamide 612 was obtained. The obtained polymer had a molecular weight (Mn) of about 20000 and a ratio of terminal amino group/terminal carboxyl group 1/9. The polymer was used for Resin composition (A6).

Resin Compositions B1 to B2

The following resin compositions (B1 to B2) were prepared by use of a polyamide 66 (a polycondensate of hexamethylenediamine and adipic acid) as a thermoplastic resin. A calculation with MOPACPM3 was carried out for the following constitutive unit.

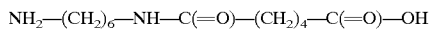

Resin Composition (B1)

A polyamide 66 [terminal $NH_2$/terminal COOH=1/1 (molar ratio)]

Preparation

A resin composition was prepared by the same manner as in Resin composition (A4) except for using a monomer combination of hexamethylenediamine and adipic acid to obtain a polyamide 66 having a molecular weight (Mn) of about 20000 to 25000 and a ratio of terminal amino group/terminal carboxyl group=1/1. The polyamide 66 was used for Resin composition (B1).

Resin Composition (B2)

A polyamide 66 [terminal $NH_2$/terminal COOH=1/3 (molar ratio)]

Preparation

A preparation procedure was conducted in the same manner as in Resin composition (A6) except for using a monomer combination of hexamethylenediamine and adipic acid to obtain a polyamide 66 having a molecular weight (Mn) of about 20000 of and a ratio of terminal amino group/terminal carboxyl group=1/9. The polyamide 66 and Resin composition (B1) were kneaded in a weight ratio of 62.5/37.5 by a biaxial extruder, and the resulting resin composition was employed for Resin composition (B2).

Resin Compositions C1 to C3

The following resin composition (C1 to C3) were prepared with use of a polyamide 6 (a ring-opening polymerized product of ε-caprolactam) as a thermoplastic resin. A calculation with MOPACPM3 was carried out with use of the following unit as a constitutive unit.

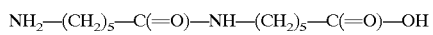

Resin Composition (C1)

A polyamide 6 [terminal $NH_2$/terminal COOH=1/1 (molar ratio)]

Preparation

An aqueous solution containing ε-caprolactam in an amount of 80% by weight was heated at 250 to 260° C. in the presence of a small amount of phosphoric acid in an autoclave substituted with nitrogen gas to remove water with nitrogen gas from the reaction system for 4 hours. Subsequently, the temperature of the inside system was gradually elevated to 275° C. for taking 1 hour to remove a residual water to outside system. After cooling, a polyamide 6 was obtained. The obtained polymer had a molecular weight (Mn) of about 20000 to 25000 and a ratio of terminal amino group/terminal carboxyl group=1/1. The polymer was used for Resin composition (C1).

Resin Composition (C2)

A polyamide 6 (terminal $NH_2$/terminal COOH=1/3 (molar ratio))

Preparation

A predetermined amount of hexamethylenediamine was added to an aqueous solution containing ε-caprolactam in an amount of 80% by weight, and the mixture was heated at 250 to 260° C. in the presence of a small amount of phosphoric acid in an autoclave substituted with nitrogen gas to flow out water with nitrogen gas from the reaction system for 4 hours. The temperature of the system was gradually raised to 275° C. with taking 1 hour to remove a residual water from the system, and the applied pressure of the autoclave was reduced to be an atmospheric pressure. After cooling, a polyamide 6 was obtained. The polyamide 6 had a molecular weight (Mn) of about 20000 and a ratio of terminal amino group/terminal carboxyl group=9/1. The polymer was used for Resin composition (C4). Resin composition (C4) and Resin composition (C1) were kneaded in a weight ratio of the former/the latter=37.5/62.5, and the resulting resin composition was employed for Resin composition (C2).

Resin Composition (C3)

A polyamide 6 [terminal $NH_2$/terminal COOH=1/4 (molar ratio)]

Preparation

Resin composition (C1) and Resin composition (C4) were kneaded in a weight ratio of 25/75 as the former/the latter ratio to obtain Resin composition (C3).

Resin Compositions D1 to D3

The following resin compositions (D1 to D3) were prepared by using a polyamide 46 (a polycondensation product of diaminobutane and adipic acid) as a thermoplastic resin. A calculation with MOPACPM3 was carried out for the following constitutive unit.

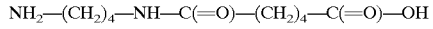

Resin Composition (D1)

A polyamide 46 [terminal $NH_2$/terminal COOH=1/1 (molar ratio)]

Resin Composition (D2)

A polyamide 46 [terminal $NH_2$/terminal COOH=1/3 (molar ratio)]

Resin Composition (D3)
A polyamide 46 (terminal $NH_2$/terminal COOH=1/4 (molar ratio))

Resin Compositions E1 to E3
The following resin compositions (E1 to E3) were prepared by using a polycondensate of terephthalic acid and trimethylhexamethylenediamine (an aromatic polyamide A5) as a thermoplastic resin. A MOPACPM3 calculation was carried out for the following constitutive unit.

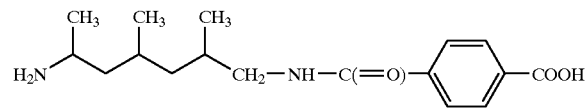

Resin Composition (E1)
An aromatic polyamide A5 [terminal $NH_2$/terminal COOH=1/1 (molar ratio)]
Preparation
A resin composition was prepared in the same manner as in Resin composition (A4) except for using a monomer combination of trimethylhexamethylene diamine and terephthalic acid to give a polymer having a molecular weight (Mn) of about 20000 to 25000 and a weight ratio of terminal amino group/terminal carboxyl group=1/1. The polymer was used as Resin composition (E1).

Resin Composition (E2)
An aromatic polyamide A5 [terminal $NH_2$/terminal COOH=1/3 (molar ratio)]
Preparation
A resin composition was prepared in the same manner as in Resin composition (A6) except for using a monomer combination of trimethylhexamethylene diamine and terephthalic acid to obtain a polymer having a molecular weight (Mn) of about 20000 and a weight ratio of terminal amino group/terminal carboxyl group=1/9. The polymer was used for Resin composition (E4). Resin composition (E4) and Resin composition (E1) were kneaded in a weight ratio of 62.5/37.5 by a biaxial extruder, and the obtained resin composition was used as Resin composition (E2).

Resin Composition (E3)
An aromatic polyamide A5 [terminal $NH_2$/terminal COOH=1/4 (molar ratio)]
Preparation
Resin composition (E1) and Resin composition (E4) were kneaded in a weight ratio of 25/75 as the former/the latter to obtain Resin composition (E3).

Resin Compositions F1 to F3
The following resin compositions (F1 to F3) were prepared by using a polycondensation product of dodecanedicarboxylic acid and bis(4-aminocyclohexyl) methane (an alicyclic polyamide A6) as a thermoplastic resin. The following constitutive unit was used for a MOPACPM3 calculation.

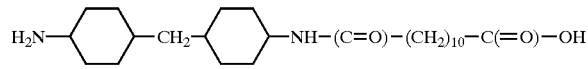

Resin Composition (F1)
An alicyclic polyamide A6 [terminal $NH_2$/terminal COOH=1/1 (molar ratio)]
Preparation
The same manner as in Resin composition (A4) was repeated except for using a monomer combination of bis(4-aminocyclohexyl) methane and dodecanedicarboxylic acid to obtain a polymer having a molecular weight (Mn) of about 20000 to 25000 and a ratio of terminal amino group/terminal carboxyl group=1/1. The polymer was employed as Resin composition (F1).

Resin Composition (F2)
An alicyclic polyamide A6 [terminal $NH_2$/terminal COOH=1/2 (molar ratio)]
Preparation
A resin composition was produced by the same manner as in Resin composition (A6) except for using a monomer combination of bis(4-aminocyclohexyl) methane and dodecanedicarboxylic acid to give a polymer having a molecular weight (Mn) of about 20000 of and a weight ratio of terminal amino group/terminal carboxyl group=1/9. The polymer was Resin composition (F4). Resin composition (F4) and Resin composition (F1) were kneaded in a weight ratio of 133.4/66.6 as the former/the latter ratio by a biaxial extruder, and the obtained resin composition was used as Resin composition (F2).

Resin Composition (F3)
An alicyclic polyamide A6 [terminal $NH_2$/terminal COOH=1/3 (molar ratio)]
Preparation
Resin composition (F4) and Resin composition (F1) were kneaded by a biaxial extruder in a proportion of 62.5/37.5 (weight ratio) as a former/latter ratio, and the obtained resin composition was used as Resin composition (F3).

Resin Compositions G1 to G2
The following resin compositions (G1 to G2) were prepared by using PBT (a polycondensation product of terephthalic acid and 1,4-butanediol) or an amine-modified PBT (a reaction product of the PBT and hexamethylenediamine) as a thermoplastic resin. A calculation with MOPACPM3 was carried out based upon the following constitutive unit.

for the PBT:

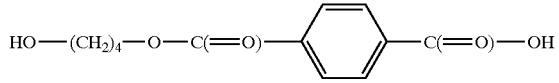

for the amine-modified PBT:

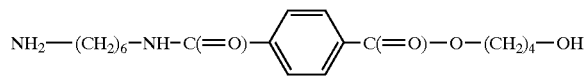

Resin Composition (G1)
A PBT [terminal OH/terminal COOH=1/1 (molar ratio))
(Preparation)
To a reactor equipped with a nitrogen-introducing unit and a distilling unit were charged 14.587 kg of dimethyl terephthalate, 6.767 kg of 1,4-butanediol, 30 g of calcium acetate, and 60 g of antimony oxide, and the mixture was heated at 180° C. with supplying nitrogen gas. At the point of confirming an effluent of methanol, the mixture was gradually heated to 270° C. under a reduced pressure with stirring to reach degree of vacuum of not more than 100 Pa. With confirming an effluent of ethylene glycol, the mixture was heated at 270° C. for 3 hours. The resultant was allowed to stand for cooling. The obtained polymer was used for Resin composition (G1).

Resin Composition (G2)
An amine-modified PBT [terminal $NH_2$/terminal OH=1/1 (molar ratio)]
Preparation
Resin composition (G2) was obtained by kneading Resin composition (G1) and an equimolar methylenediamine relative to a carboxylic group content of Resin composition (G1) at 230° C. for 30 minutes with use of a keader.

Resin Compositions H

As Resin composition H, poly(2,5-dimethylphenylene ether) (manufactured by Degussa Co. Ltd., Vestoran 1990) was used. A MOPACPM3 calculation was carried out based upon the following constitutive unit.

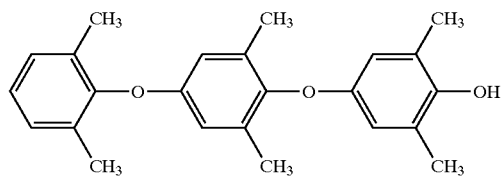

Resin Compositions I

A polypropylene was used as Resin composition I. A MOPACPM3 calculation was conducted for the following constitutive unit.

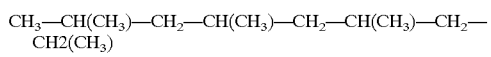

Resin Compositions J

A polyacetal (manufactured by Polyplastics Co. Ltd., Juracone M90) was used as Resin composition J. A calculation with MOPACPM3 was carried out for the following basic unit.

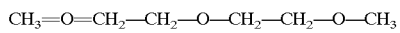

Resin Compositions K

A polyphenylene sulfide [manufactured by Polyplastics Co. Ltd., Fortlon 0220A9 (non-charged)] was used for a resin composition K. The following constitutive unit was bases for calculation of MOPACPM3.

A resin and a vulcanization-activating agent in a predetermined ratio were mixed or compounded into resin compositions (L to P).

Resin Compositions L1 to L2

Resin Composition (L1)
(i) 100 parts by weight of a polyamide 612 [terminal $NH_2$/terminal COOH=1/1 (mole ratio)] and
(ii) 3 parts by weight of a vulcanization-activating agent (trimethylolpropane trimethacrylate)

Resin composition (L2)
(i) 100 parts by weight of a polyamide 612 (terminal $NH_2$/terminal COOH=1/9 (mole ratio)] and
(ii) 3 parts by weight of a vulcanization-activating agent (trimethylolpropane trimethacrylate)

Resin Compositions M1 to M2

Resin Composition (M1)
(i) 100 parts by weight of a polyamide 6 [terminal $NH_2$/terminal COOH=1/1 (mole ratio)] and
(ii) 3 parts by weight of a vulcanization-activating agent (triallyl isocyanurate)

Resin Composition (M2)
(i) 100 parts by weight of a polyamide 6 [terminal $NH_2$/terminal COOH=1/4 (mole ratio)] and
(ii) 3 parts by weight of a vulcanization-activating agent (triallyl isocyanurate)

Resin Compositions N
(i) 100 parts by weight of an aromatic polyamide A5 terminal $NH_2$/terminal COOH=1/4 (mole ratio)] and
(ii) 3 parts by weight of a vulcanization-activating agent (N,N'-1,3-phenylenedimaleimide)

Resin Compositions O
(i) 100 parts by weight of a PBT [terminal $NH_2$/terminal COOH=1/1 (mole ratio)] and
(ii) 3 parts by weight of a vulcanization-activating agent (trimethylolpropane trimethacrylate)

Resin Compositions P
(i) 100 parts by weight of a polyphenylene sulfide and
(ii) 3 parts by weight of a vulcanization-activating agent (triallyl cyanurate)

Silicone Rubber Composition

Silicone Rubber Compositions R1 to R4

To 100 parts by weight of a silicone rubber SH851 (manufactured by Toray Dow Corning Co. Ltd.), 5 parts by weight of dicumyl peroxide ("Percumyl D" manufactured by NOF Corporation) was added, and the mixture was kneaded by a roll at room temperature for 10 minutes to obtain a silicone rubber composition R1.

A silicone rubber composition R2 was produced by the same manner as that of the silicone rubber composition R1 except for further adding 1 part by weight of trimethylolpropane trimethacrylate.

A silicone rubber composition R3 was produced by the same manner as that of the silicone rubber composition R1 except for using a silicone rubber 4104U (manufactured by Toray Dow Corning Co. Ltd.) instead of the silicone rubber SH851.

A silicone rubber composition R4 was produced by the same manner as that of the composition R3 except for further adding 1 part by weight of trimethylolpropane trimethacrylate.

Silicone Rubbers VMQ 1 to 3

Silicone rubbers VMQ 1 to 3 were prepared as follows.

A mixture of (A) dimethyl chlorosilane [$(CH_3)_2SiCl_2$] and (B) methylvinylchlorosilane [$(CH_3)(CH_2=CH)SiCl_2$] in a given propotion was hydrolyzed in dioxane with a large amount of water, and the resulting hydrogen chloride was washed with water to be removed. After a resulting mixture of a cyclic dimethylsiloxane and a linear dimethylsiloxane was distilled to separate (C) a tetramer of a cyclic dimethylsiloxane-methylvinylsiloxane, and then the (C) tetramer was polymerized with potassium hydroxide as a catalyst at 155° C. in an atmosphere of nitrogen gas to obtain a polymer.

VMQ1: (C1) a tetramer of a cyclic dimethylsiloxane-methylvinylsiloxane was obtained as a mole ratio of (A) to (B) of 99.98/0.02. Relative to 100 mol of the (C1) tetramer, 0.0011 mol of potassium hydroxide was added to the (C1) tetramer, and polymerized. A limiting viscosity [$\eta$] (25° C., cSt) of the resultant polymer (a siloxane A) was determined, and as a result, the value of log$\eta$ was 7.7. An average molecular weight and a polymerization degree were 290000 and 4000, respectively as estimated from the above value. Moreover, the obtained polymer was subjected to $^1$H-NMR to measure the number of a double bond, and the number of a double bond was 0.02 of vinyl group on average per 100 repeating units, namely, 0.8 of the vinyl group on the average per molecule.

Moreover, (C2) a tetramer of a cyclic dimethylsiloxane-methylvinylsiloxane was obtained as a mole ratio of (A) to (B) of 50/50. Relative to 100 mol of the (C2) tetramer, 0.45 mol of potassium hydroxide was added to the (C2) tetramer, and polymerized. The resultant polymer (a siloxane B) was subjected to a gas chromatography [capillary column: DURABOND DB-1701 manufactured by J&W Co.Ltd., injection temperature: cooling on column method (rising a temperature to 270° C. at a rate of 50° C./30 seconds), carrier gas: helium (30 ml/min), detector: FID], and the polymerization degree was about 10. Moreover, the obtained polymer was subjected to $^1$H-NMR to determine the number of a double bond, and the number of the double bond was 50 of vinyl groups on average per 100 repeating units, namely, 5 of the vinyl groups on average per molecule. The siloxane A and the siloxane B were mixed in a weight ratio of the former to the latter of 47/53, and VMQ1 having the number of a double bond of 2.96 on average per molecule was obtained.

VMQ2: (C3) a tetramer of a cyclic dimethylsiloxane-methylvinylsiloxane was obtained as a mole ratio of (A) to (B) of 90/10. Relative to 100 mol of the (C3) tetramer, a ratio of 0.044 mol of potassium hydroxide was added to the (C3) tetramer, and polymerized. The limiting viscosity [η] (25° C., cSt) of the obtained polymer (a siloxane C) was determined, and as a result, the value of logη was 2.07. An average molecular weight and a polymerization degree were 7400 and 100, respectively as estimated from the above value. Moreover, the polymer was subjected to $^1$H-NMR to measure the number of a double bond, and the number of the double bond was 11 of vinyl groups on average per 100 repeating units, namely, 11 of the vinyl groups on average per molecule. The siloxane A and the siloxane C were mixed in a weight ratio of the former to the latter of 98/2, and VMQ2 having the number of a double bond of 1 on average per molecule was obtained.

VMQ3: (C1) a tetramer of a cyclic dimethylsiloxane-methylvinylsiloxane was obtained as a mole ratio of (A) to (B) of 99.98/0.02. Relative to 100 mol of the (C1) tetramer, a ratio of 0.0045 mol of potassium hydroxide was added to the (C1) tetramer, and polymerized. The limiting viscosity [η] (25° C., cSt) of the obtained polymer (a siloxane D) was determined, and as a result, the value of logη was 4.3. An average molecular weight and a polymerization degree were 74000 and 1000, respectively as estimated from the above value. Moreover, the polymer was subjected to $^1$H-NMR to measure the number of a double bond, and the number of the double bond was 0.02 of vinyl group on average per 100 repeating units, that is, 0.2 of the vinyl group on average per molecule. The siloxane C and the siloxane D were mixed in a weight ratio of the former to the latter of 4/96, and VMQ3 having the number of a double bond of 0.65 on average per molecule was obtained.

VMQ4: The siloxane D was used for VMQ4.

(Silicone Rubber Compositions R5 to 12)

To each of the silicone rubbers VMQ1 to VMQ4 were added, according to formulation described in Table 5, a dry powdered silica ("Aerogil 130" manufactured by Nihon Aerogil (Degussa) Co. Ltd.) or a wet powdered silica ("Nipseal VN3" manufactured by Nihon silica Co. Ltd.), and a dicumyl peroxide as an organic peroxide ("Percumyl D" manufactured by NOF Corporation), if necessary, trimethylol propane trimethacrylate as a vulcanization-activating agent, the mixture were kneaded by a roll at room temperature for 10 minutes to obtain silicone rubber compositions R5 to 12.

Adhesive Strength Measurement

The above mentioned resin composition was subjected to an injection-molding to produce a plate of 100 mm×100 mm×4 mm. After the plate was horizontally put in a mold, 40 g of a silicone rubber composition was laminated on the plate, and the laminated plate was pressed by a press molding apparatus under a pressure of 300 kg/cm² (30 MPa) at a temperature of 140° C. for 10 minutes to conduct vulcanization or crosslinking. After the completion of vulcanization, the resulting plate of a silicone rubber laminated on a resin was taken out from the mold, and the plate was subjected to a peeling or adhesion test in order to measure an adhesive strength between the resin member and the rubber member.

A result of the peeling or adhesion test was classified into the following criteria to evaluate an adhesive strength.

A: Remarkably film adhesion was achieved, and when the resin member was peeled from the rubber member forcibly, the specimen was broken with a cohesive failure.

B: Firm adhesion was achieved, and when the resin member was peeled from the rubber member forcibly, the resin member was peeled from the rubber member along the interface.

C: The rubber member was sticky adhered to the resin member on interface thereof.

D: The rubber member was easily separated from the resin member along the interface.

Results

The results of Examples and Comparative examples are set forth in Tables 1 to 4 and 6 to 13. In the Tables, the term "the number of active atom per molecule" represents the number of an active atom having S of not less than 0.006 per molecule, which is calculated by MOPACPM3, of the thermoplastic resin. Moreover, on the above calculation, Ec value was used −8 eV for a radical-generating agent comprising an organic peroxide.

TABLE 1

Unvulcanized silicone rubber composition R1

| | thermoplastic resin composition | number of active atom per molecule | adhesive strength |
|---|---|---|---|
| Example 1 | A1 | 7.2 | B |
| Example 2 | A2 | 7.2 | B |
| Example 3 | A3 | 7.2 | B |
| Example 4 | A4 | 4 | B |
| Example 5 | A5 | 2.4 | B |
| Comparative example 1 | A6 | 0.8 | D |
| Example 6 | B1 | 2 | B |
| Comparative example 2 | B2 | 1 | D |
| Example 7 | C1 | 7.2 | B |
| Example 8 | C2 | 2 | B |
| Comparative example 3 | C3 | 1.6 | D |
| Example 9 | D1 | 4 | B |
| Example 10 | D2 | 2 | B |
| Comparative example 4 | D3 | 1.6 | D |
| Example 11 | E1 | 5 or more | B |
| Example 12 | E2 | 4 or more | B |
| Example 13 | E3 | 3.8 or more | B |
| Example 14 | F1 | 3 | B |
| Example 15 | F2 | 2 | B |
| Comparative example 5 | F3 | 1.2 | D |
| Example1 16 | G2 | 4 | B |
| Example1 17 | H | 6 or more | B |
| Example1 18 | I | 9 or more | B |
| Example1 19 | J | 6 or more | B |
| Example 20 | L1 | 4 | A |
| Example 21 | L2 | 0.8 | C |

TABLE 2

Unvulcanized silicone rubber composition R2

| | thermoplastic resin composition | number of active atom per molecule | adhesive strength |
|---|---|---|---|
| Example 22 | A1 | 7.2 | A |
| Example 23 | A2 | 7.2 | A |
| Example 24 | A3 | 7.2 | A |
| Example 25 | A4 | 4 | A |
| Example 26 | A5 | 2.4 | A |
| Example 27 | A6 | 0.8 | C |
| Example 28 | B1 | 2 | B |
| Example 29 | B2 | 1 | C |
| Example 30 | C1 | 7.2 | A |
| Example 31 | C2 | 2 | B |
| Example 32 | C3 | 1.6 | C |
| Example 33 | D1 | 4 | B |
| Example 34 | D2 | 2 | B |
| Example 35 | D3 | 1.6 | C |
| Example 36 | E1 | 5 or more | A |
| Example 37 | E2 | 4 or more | A |
| Example 38 | E3 | 3.8 or more | A |
| Example 39 | F1 | 3 | A |
| Example 40 | F2 | 2 | A |
| Example 41 | F3 | 1.2 | C |
| Example 42 | G2 | 4 | A |
| Example 43 | H | 6 or more | A |
| Example 44 | I | 9 or more | B |
| Example 45 | J | 6 or more | A |
| Example 46 | L1 | 4 | A |
| Example 47 | L2 | 0.8 | B |

TABLE 3

Unvulcanized silicone rubber composition R3

| | thermoplastic resin composition | number of active atom per molecule | adhesive strength |
|---|---|---|---|
| Example 48 | A1 | 7.2 | A |
| Example 49 | A2 | 7.2 | A |
| Example 50 | A3 | 7.2 | A |
| Example 51 | A4 | 4 | B |
| Example 52 | A5 | 2.4 | B |
| Example 53 | A6 | 0.8 | C |
| Example 54 | B1 | 2 | B |
| Comparative example 6 | B2 | 1 | D |
| Example 55 | C1 | 7.2 | B |
| Example 56 | C2 | 2 | B |
| Comparative example 7 | C3 | 1.6 | D |
| Example 57 | D1 | 4 | B |
| Example 58 | D2 | 2 | B |
| Comparative example 8 | D3 | 1.6 | D |
| Example 60 | E1 | 5 or more | B |
| Example 61 | E2 | 4 or more | B |
| Example 62 | E3 | 3.8 or more | B |
| Example 63 | F1 | 3 | A |
| Example 64 | F2 | 2 | A |
| Comparative example 9 | F3 | 1.2 | D |
| Example 65 | G2 | 4 | B |
| Example 66 | H | 6 or more | A |
| Example 67 | I | 9 or more | B |
| Example 68 | J | 6 or more | B |
| Example 69 | L1 | 4 | A |
| Example 70 | L2 | 0.8 | B |

TABLE 4

Unvulcanized silicone rubber composition R4

| | thermoplastic resin composition | number of active atom per molecule | adhesive strength |
|---|---|---|---|
| Example 71 | A1 | 7.2 | A |
| Example 72 | A2 | 7.2 | A |
| Example 73 | A3 | 7.2 | A |
| Example 74 | A4 | 4 | A |
| Example 75 | A5 | 2.4 | A |
| Example 76 | A6 | 0.8 | C |
| Example 77 | B1 | 2 | A |
| Example 78 | B2 | 1 | C |
| Example 79 | C1 | 7.2 | A |
| Example 80 | C2 | 2 | A |
| Example 81 | C3 | 1.6 | C |
| Example 82 | D1 | 4 | A |
| Example 83 | D2 | 2 | B |
| Example 84 | D3 | 1.6 | C |
| Example 85 | E1 | 5 or more | A |
| Example 86 | E2 | 4 or more | A |
| Example 87 | E3 | 3.8 or more | A |
| Example 88 | F1 | 3 | A |
| Example 89 | F2 | 2 | A |
| Example 90 | F3 | 1.2 | C |
| Example 91 | G2 | 4 | A |
| Example 92 | H | 6 or more | A |
| Example 93 | I | 9 or more | B |
| Example 94 | J | 6 or more | A |
| Example 95 | L1 | 4 | A |
| Example 96 | L2 | 0.8 | A |

TABLE 5

| | Formula No. | | | | | | | |
|---|---|---|---|---|---|---|---|---|
| | R5 | R6 | R7 | R8 | R9 | R10 | R11 | R12 |
| Rubber composition | | | | | | | | |
| silicone rubber | VMQ1 | VMQ2 | VMQ2 | VMQ2 | VMQ3 | VMQ3 | VMQ3 | VMQ4 |
| double bond amount (mol %) | 2.96 | 1.00 | 1.00 | 1.00 | 0.65 | 0.65 | 0.65 | 0.20 |

TABLE 5-continued

| | Formula No. | | | | | | | |
|---|---|---|---|---|---|---|---|---|
| | R5 | R6 | R7 | R8 | R9 | R10 | R11 | R12 |
| amount of rubber (parts by weight) | 60 | 60 | 60 | 60 | 60 | 60 | 60 | 60 |
| powdered silica | dry | dry | dry | wet | dry | dry | wet | dry |
| amount of powdered silica (parts by weight) | 40 | 40 | 40 | 40 | 40 | 40 | 40 | 40 |
| peroxide (parts by weight) | 4 | 4 | 1 | 1 | 4 | 1 | 1 | 4 |
| vulcanization-activating agent (parts by weight) | — | — | 0.5 | 0.5 | — | 0.5 | 0.5 | — |

TABLE 6

Unvulcanized silicone rubber composition R5

| | thermoplastic resin composition | number of active atom per molecule | adhesive strength |
|---|---|---|---|
| Example 97 | A1 | 7.2 | A |
| Example 98 | A4 | 4 | A |
| Example 99 | A6 | 0.8 | C |
| Example 100 | B1 | 2 | B |
| Example 101 | C1 | 7.2 | B |
| Example 102 | F1 | 3 | A |
| Example 103 | G1 | 0 | B |
| Example 104 | H | 6 or more | A |
| Example 105 | K | 2 or more | B |
| Example 106 | L1 | 4 | A |
| Example 107 | L2 | 0.8 | A |
| Example 108 | M1 | 7.2 | A |
| Example 109 | M2 | 1.6 | B |
| Example 110 | N | 3.8 | A |
| Example 111 | O | 0 | A |
| Example 112 | P | 2 or more | A |

TABLE 7

Unvulcanized silicone rubber composition R6

| | thermoplastic resin composition | number of active atom per molecule | adhesive strength |
|---|---|---|---|
| Example 113 | A4 | 4 | B |
| Example 114 | A6 | 0.8 | C |
| Example 115 | B1 | 2 | B |
| Example 116 | C1 | 7.2 | B |
| Example 117 | G1 | 0 | C |
| Example 118 | H | 6 or more | B |
| Example 119 | K | 2 or more | B |
| Example 120 | L1 | 4 | A |
| Example 121 | L2 | 0.8 | B |
| Example 122 | M1 | 7.2 | A |
| Example 123 | M2 | 1.6 | B |
| Example 124 | N | 3.8 | B |
| Example 125 | O | 0 | A |
| Example 126 | P | 2 or more | A |

TABLE 8

Unvulcanized silicone rubber composition R7

| | thermoplastic resin composition | number of active atom per molecule | adhesive strength |
|---|---|---|---|
| Example 127 | A4 | 4 | A |
| Example 128 | A6 | 0.8 | B |
| Example 129 | B1 | 2 | A |
| Example 130 | C1 | 7.2 | A |
| Example 131 | G1 | 0 | A |
| Example 132 | H | 6 or more | A |
| Example 133 | K | 2 or more | A |
| Example 134 | L1 | 4 | A |
| Example 135 | L2 | 0.8 | A |
| Example 136 | M1 | 7.2 | A |
| Example 137 | M2 | 1.6 | A |
| Example 138 | N | 3.8 | A |
| Example 139 | O | 0 | A |
| Example 140 | P | 2 or more | A |

TABLE 9

Unvulcanized silicone rubber composition R8

| | thermoplastic resin composition | number of active atom per molecule | adhesive strength |
|---|---|---|---|
| Example 141 | A4 | 4 | B |
| Example 142 | A6 | 0.8 | B |
| Example 143 | B1 | 2 | B |
| Example 144 | C1 | 7.2 | B |
| Example 145 | G1 | 0 | B |
| Example 146 | H | 6 or more | B |
| Example 147 | K | 2 or more | B |
| Example 148 | L1 | 4 | A |
| Example 149 | L2 | 0.8 | C |
| Example 150 | M1 | 7.2 | A |
| Example 151 | M2 | 1.6 | C |
| Example 152 | N | 3.8 | B |
| Example 153 | O | 0 | A |
| Example 154 | P | 2 or more | A |

TABLE 10

Unvulcanized silicone rubber composition R9

|  | thermoplastic resin composition | number of active atom per molecule | adhesive strength |
| --- | --- | --- | --- |
| Example 155 | A1 | 7.2 | A |
| Example 156 | A4 | 4 | B |
| Comparative example 10 | A6 | 0.8 | D |
| Example 157 | B1 | 2 | B |
| Example 158 | C1 | 7.2 | B |
| Example 159 | F1 | 3 | A |
| Example 160 | G1 | 0 | C |
| Example 161 | H | 6 or more | B |
| Example 162 | K | 2 or more | C |
| Example 163 | L1 | 4 | A |
| Example 164 | L2 | 0.8 | C |
| Example 165 | M1 | 7.2 | A |
| Example 166 | N | 3.8 | B |
| Example 167 | O | 0 | A |
| Example 168 | P | 2 or more | A |

TABLE 11

Unvulcanized silicone rubber composition R10

|  | thermoplastic resin composition | number of active atom per molecule | adhesive strength |
| --- | --- | --- | --- |
| Example 169 | A4 | 4 | A |
| Example 170 | A6 | 0.8 | B |
| Example 171 | B1 | 2 | B |
| Example 172 | C1 | 7.2 | A |
| Example 173 | G1 | 0 | A |
| Example 174 | H | 6 or more | A |
| Example 175 | K | 2 or more | A |
| Example 176 | L1 | 4 | A |
| Example 177 | L2 | 0.8 | B |
| Example 178 | M1 | 7.2 | A |
| Example 179 | M2 | 1.6 | B |
| Example 180 | N | 3.8 | A |
| Example 181 | O | 0 | A |
| Example 182 | P | 2 or more | A |

TABLE 12

Unvulcanized silicone rubber composition R11

|  | thermoplastic resin composition | number of active atom per molecule | adhesive strength |
| --- | --- | --- | --- |
| Example 183 | A4 | 4 | B |
| Example 184 | A6 | 0.8 | B |
| Example 185 | B1 | 2 | B |
| Example 186 | C1 | 7.2 | C |
| Example 187 | G1 | 0 | B |
| Example 188 | H | 6 or more | C |
| Example 189 | K | 2 or more | B |
| Example 190 | L1 | 4 | B |
| Example 191 | L2 | 0.8 | C |
| Example 192 | M1 | 7.2 | B |
| Example 193 | M2 | 1.6 | C |
| Example 194 | N | 3.8 | B |
| Example 195 | O | 0 | B |
| Example 196 | P | 2 or more | B |

TABLE 13

Unvulcanized silicone rubber composition R12

|  | thermoplastic resin composition | number of active atom per molecule | adhesive strength |
| --- | --- | --- | --- |
| Example 197 | A1 | 7.2 | C |
| Example 198 | A4 | 4 | C |
| Comparative example 11 | A6 | 0.8 | D |
| Example 199 | B1 | 2 | C |
| Example 200 | C1 | 7.2 | C |
| Example 201 | F1 | 3 | C |
| Example 202 | G1 | 0 | C |
| Example 203 | H | 6 or more | C |
| Example 204 | L1 | 4 | B |
| Example 205 | M1 | 7.2 | B |
| Example 206 | N | 3.8 | C |
| Example 207 | O | 0 | A |
| Example 208 | P | 2 or more | B |

As apparent from Tables 1 to 4 and 6 to 13, in Comparative examples, a peeling on the interface between the resin member and the silicone rubber member occurred, and meanwhile in Examples, the resin member and the silicone rubber member were adhered or stuck together on interface thereof.

What is claimed is:

1. A composite of a vulcanized silicone rubber member formed by a vulcanization of an unvulcanized silicone rubber, and a resin member comprising a thermoplastic resin and directly bonded to the rubber member, wherein the resin member bonds directly to the vulcanized silicone rubber member vulcanized or crosslinked with a radical-generating agent without an adhesive treatment of the resin member, and the thermoplastic resin is a thermoplastic resin having at least 2 atoms, as average, selected from a hydrogen atom and a sulfur atom per molecule, each atom having an orbital interaction energy coefficient S of not less than 0.006, wherein the orbital interaction energy coefficient S is represented by the following formula (1):

$$S=(C_{HOMO,n})^2/|E_c-E_{HOMO,n}|+(C_{LUMO,n})^2/|E_c-E_{LUMO,n}| \quad (1)$$

in the formula (1), each of $E_c$, $C_{HOMO,n}$, $E_{HOMO,n}$, $C_{LUMO,n}$, and $E_{LUMO,n}$ represents a value calculated by a semiempirical molecular orbital method MOPACPM3, $E_c$ representing an orbital energy (eV) of a radical of the radical-generating agent, $C_{HOMO,n}$ representing a molecular-orbital coefficient of a highest occupied molecular orbital (HOMO) of an n-th hydrogen or sulfur atom in a constitutive unit of the thermoplastic resin, $E_{HOMO,n}$ representing an orbital energy (eV) of the HOMO, $C_{LUMO,n}$ representing a molecular-orbital coefficient of a lowest unoccupied molecular orbital (LUMO) of the n-th hydrogen or sulfur atom in the constitutive unit of the thermoplastic resin, and $E_{LUMO,n}$ representing an orbital energy (eV) of the LUMO.

2. A composite according to claim 1, wherein the thermoplastic resin comprises at least one thermoplastic resin selected from the group consisting of a polyamide-series resin, a polyester-series resin, a poly(thio) ether-series resin, a polycarbonate-series resin, a polyimide-series resin, a polysulfone-series resin, a polyolefinic resin, a halogen-containing vinyl-series resin, a polyurethane-series resin, and a thermoplastic elastomer.

3. A composite according to claim 1, wherein the thermoplastic resin comprises at least one member selected from an aliphatic polyamide-series resin, an aromatic polyester-series resin, a polyacetal-series resin, a polyphenylene ether-series resin, a polysulfide-series resin, a polyether ketone-series resin, an aromatic polycarbonate-series resin, a polyimide-series resin, a polysulfone-series resin, a polyolefinic resin, a halogen-containing vinyl-series resin, a polyurethane-series resin, a polyamide-series elastomer, a polyester-series elastomer, a polyurethane-series elastomer, a polystyrenic elastomer, and a polyolefinic elastomer.

4. A composite according to claim 1, wherein at least one component selected from the unvulcanized silicone rubber and the thermoplastic resin comprises a vulcanization-activating agent containing a polyfunctional polymerizable compound having a plurality of polymerizable groups.

5. A composite according to claim 1, wherein the thermoplastic resin comprises a vulcanization-activating agent containing a polyfunctional polymerizable compound having a plurality of polymerizable groups.

6. A composite according to claim 1, wherein at least one component selected from the unvulcanized silicone rubber and the thermoplastic resin comprises a vulcanizing auxiliary comprising a compound having at least 2 hydrogen atoms on average per molecule, each hydrogen atom having the orbital interaction energy coefficient of not less than 0.006.

7. A composite according to claim 1, wherein the vulcanized silicone rubber member is vulcanized or crosslinked with a radical-generating agent and a polyfunctional polymerizable compound having a plurality of polymerizable groups.

8. A composite according to claim 1, wherein the unvulcanized silicone rubber has unsaturated bonds of not less than 2 on average per molecule.

9. A composite according to claim 1, wherein the unvulcanized silicone rubber comprises a silica as a filler.

10. A composite according to claim 9, wherein the silica comprises a dry silica.

11. A composite according to claim 1, wherein the unvulcanized silicone rubber comprises any silicone rubber of the followings (i) to (iii);
  (i) a silicone rubber comprising a vulcanization-activating agent containing a polyfunctional polymerizable compound having a plurality of polymerizable groups, and having unsaturated bonds of not less than 2 on average per molecule,
  (ii) a silicone rubber comprising a silica and having unsaturated bonds of not less than 2 on the average per molecule, and
  (iii) a silicone rubber comprising a vulcanization-activating agent containing a polyfunctional polymerizable compound having a plurality of polymerizable groups, and a silica.

12. A composite according to claim 1, wherein the radical-generating agent comprises an organic peroxide.

13. A composite according to claim 1, wherein the ratio of the radical-generating agent is 1 to 10 parts by weight relative to 100 parts by weight of the unvulcanized rubber.

14. A composite according to claim 4, wherein the ratio of the polyfunctional polymerizable compound is 0.1 to 10 parts by weight relative to 100 parts by weight of at least one component selected from the unvulcanized rubber and the thermoplastic resin.

15. A composite according to claim 6, wherein the ratio of the vulcanization auxiliary is 0.1 to 30 parts by weight relative to 100 parts by weight of at least one component selected from the unvulcanized rubber and the thermoplastic resin.

16. A process for producing a composite of a thermoplastic resin-containing resin member bonded to a vulcanized silicone rubber member formed by vulcanization of a rubber composition comprising a radical-generating agent and an unvulcanized silicone rubber, which comprises molding a resin molding element and a rubber molding element with contacting said elements each other, and vulcanizing or crosslinking the rubber molding element,
  wherein said resin molding element is either of a resin composition or a resin member, each comprising the thermoplastic resin recited in claim 1, and
  said rubber molding element is either of a rubber composition or a rubber premolded article, each comprising at least an unvulcanized rubber and a radical-generating agent being activating on a surface to be contacted with said resin molding element.

17. A process according to claim 16, wherein at least one component selected from the unvulcanized silicone rubber and the thermoplastic resin further comprises a vulcanization-activating agent containing a polymerizable compound having a plurality of polymerizable groups.

18. A process according to claim 16, wherein at least one component selected from the unvulcanized silicone rubber and the thermoplastic resin further comprises a vulcanization auxiliary comprising a compound having at least 2 hydrogen atoms on the average per molecule, each hydrogen atom having the orbital interaction energy coefficient S of not less than 0.006.

19. A process according to claim 16, which comprises heat-molding the resin member and the vulcanized rubber member with interposing a vulcanization-activating agent comprising a polymerizable compound having a plurality of polymerizable groups on a contact surface between the resin molding element and the rubber molding element to produce a composite the resin member bonded to a rubber member.

20. A process according to claim 16, which comprises heat-molding the resin member and the vulcanized rubber member with interposing
  a vulcanization-activating agent comprising a polymerizable compound having a plurality of polymerizable groups and
  a coating agent comprising a vulcanization auxiliary composed of a compound having at least average 2 hydrogen atoms per molecule, each hydrogen atom having the orbital interaction energy coefficient S of not less than 0.006
  on a contact surface between the resin molding element and the rubber molding element to produce a composite of the resin member bonded to the rubber member.

21. A process for producing a composite, which comprises heat-molding a resin member composed of a thermoplastic resin and a vulcanized silicone rubber member with interposing a vulcanization-activating agent comprising a polymerizable compound having a plurality of polymerizable groups on a contact surface between the resin member and the vulcanized silicone rubber member to produce a composite of the resin member bonded to the rubber member.

22. A process for producing a composite, which comprises heat-molding a resin member composed of a thermoplastic resin and a vulcanized silicone rubber member with interposing a coating agent composed of
  a vulcanization-activating agent comprising a polymerizable compound having a plurality of polymerizable groups and
  a vulcanization auxiliary comprising a compound having at least 2 hydrogen atoms on the average per molecule, each hydrogen atom having the orbital interaction energy coefficient S of not less than 0.006 on a contact surface between the resin member and the vulcanized silicone rubber member to produce a composite of the resin member bonds to the vulcanized silicone rubber member.

* * * * *